US012142218B2

(12) United States Patent
Yin

(10) Patent No.: US 12,142,218 B2
(45) **Date of Patent: *Nov. 12, 2024**

(54) PIXEL CIRCUIT, DISPLAY PANEL, AND DISPLAY APPARATUS

(71) Applicant: BOE TECHNOLOGY GROUP CO., LTD., Beijing (CN)

(72) Inventor: Xinshe Yin, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/464,216

(22) Filed: Sep. 9, 2023

(65) Prior Publication Data

US 2023/0419905 A1 Dec. 28, 2023

Related U.S. Application Data

(63) Continuation of application No. 17/044,280, filed as application No. PCT/CN2020/082372 on Mar. 31, 2020, now Pat. No. 11,790,844.

(30) Foreign Application Priority Data

Jun. 19, 2019 (CN) ......................... 201910531896.9

(51) Int. Cl.
*G09G 3/3233* (2016.01)
*G09G 3/3266* (2016.01)
*G09G 3/3291* (2016.01)

(52) U.S. Cl.
CPC ......... *G09G 3/3233* (2013.01); *G09G 3/3266* (2013.01); *G09G 3/3291* (2013.01); *G09G 2300/0819* (2013.01); *G09G 2300/0842* (2013.01); *G09G 2300/0866* (2013.01); *G09G 2310/0286* (2013.01);

(Continued)

(58) Field of Classification Search
CPC .. G09G 3/3233; G09G 3/3266; G09G 3/3291; G09G 2300/0819; G09G 2300/0842; G09G 2300/0852; G09G 2300/0866; G09G 2310/0286; G09G 2310/061; G09G 2320/0233; G09G 2320/0238; G09G 2320/045
See application file for complete search history.

(56) References Cited

U.S. PATENT DOCUMENTS 11,081,056 B2 * 8/2021 Park ..................... G09G 3/3233
11,790,844 B2 * 10/2023 Yin ..................... G09G 3/3233 345/212
2017/0153759 A1 * 6/2017 Ding ........................ G09G 3/32

* cited by examiner

*Primary Examiner* — Stacy Khoo
(74) *Attorney, Agent, or Firm* — Syncoda LLC; Feng Ma

(57) ABSTRACT

A pixel circuit includes: a driving sub-circuit including a first end connected to a first power line, a control end connected to a first node, and a second end connected to a second node; and a compensation sub-circuit connected to the first node, the second node, a light emission control signal line to receive one of a first voltage and a reference voltage, a scanning signal line to receive one of the first control voltage and a second control voltage, and a data signal line to receive one of a data voltage and the reference voltage. Under control of the reference voltage received from the light emission control signal line, a first control voltage received from the scanning signal line, and the reference voltage received from the data signal line, when the first power line receives the first power voltage, a threshold voltage of the driving sub-circuit is compensated.

18 Claims, 13 Drawing Sheets

(52) U.S. Cl.
CPC ................. *G09G 2310/061* (2013.01); *G09G 2320/0233* (2013.01); *G09G 2320/045* (2013.01)

PIXEL CIRCUIT, DISPLAY PANEL, AND DISPLAY APPARATUS

CROSS-REFERENCE TO RELATED APPLICATIONS

This is a continuation of U.S. patent application Ser. No. 17/044,280 filed on Sep. 30, 2020, which is a national stage of International Application No. PCT/CN2020/082372 filed on Mar. 31, 2020, which claims priority to Chinese Patent Application No. 201910531896.9 filed on Jun. 19, 2019. The disclosures of the above-referenced applications are hereby incorporated by reference in their entirety.

BACKGROUND

An organic light-emitting diode (OLED) display can have pixel circuits driving arrays of OLEDs. The OLED and its driving transistor are connected in series, and the driving transistor is connected to a driving voltage $ELV_{DD}$ of the OLED display. A gate of the driving transistor is connected to the data line representing the gray-scale voltage data through the switching transistor.

SUMMARY

The present disclosure relates generally to the technical field of driving light-emitting diodes, and more specifically to a pixel circuit, a display panel, and a display apparatus.

Various embodiments of the present disclosure provide a pixel circuit that can effectively compensate the threshold voltage of the driving transistor in the pixel circuit, such that the driving current of the driving transistor is not affected by the threshold voltage, thereby ensuring the uniformity of the driving current of the driving transistor, and the pixel circuit has a simple structure, which is more in line with the requirements of the pixel circuit's high resolution.

In an aspect, a pixel circuit is provided, including:

a driving sub-circuit, the driving sub-circuit including:

a first end being connected to a first power line;

a control end being connected to a first node; and a second end being connected to a second node;

a compensation sub-circuit connected to the first node, the second node, a light emission control signal line, a scanning signal line, and a data signal line;

wherein:

the light emission control signal line is configured to receive one of a first voltage and a reference voltage;

the scanning signal line is configured to receive one of the first control voltage and a second control voltage;

the data signal line is configured to receive one of a data voltage and the reference voltage, and the first power line is configured to receive one of a reset voltage and a first power voltage;

the compensation sub-circuit is configured to be under control of the reference voltage received from the light emission control signal line, a first control voltage received from the scanning signal line, and the reference voltage received from the data signal line; and when the first power line receives the first power voltage, a threshold voltage of the driving sub-circuit is compensated.

In some embodiments, the compensation sub-circuit further includes:

a storage capacitor, the storage capacitor having a first end being connected to the light emission control signal line, and the storage capacitor having a second end being connected to the first node;

a first switch transistor having a control electrode being connected to the scanning signal line, the first switch transistor having a first electrode being connected to the second node, and the first switch transistor having a second electrode being connected to the second node; and a first capacitor, the first capacitor having a first end being connected to the second node, and the first capacitor having a second end being connected to the data signal line.

In some embodiments, the driving sub-circuit further includes:

a second switching transistor, the second switching transistor having a control pole being connected to the first node, the second switching transistor having a first pole being connected to the first power line, and the second switching transistor having a second pole being connected to the second node.

In some embodiments, the pixel circuit further includes:

a light-emitting diode, the light-emitting diode having a first end and a second end, the first end of the light-emitting diode being connected to the second node, and the second end of the light-emitting diode being connected to a second power line;

wherein the second power line is configured to receive one of a first power voltage and a second power voltage.

In some embodiments, the light-emitting diode includes:

a light-emitting element, the light-emitting element having a first end and a second end, where the first end of the light-emitting element is connected to the second node, and where the second end of the light-emitting element is connected to a second power line;

a device capacitor, the device capacitor having a first terminal and a second terminal, where the first terminal of the light-emitting diode device capacitor is connected to the first end of the light emitting element, and the second terminal of the device capacitor is connected to the second end of the light emitting element.

In some embodiments, wherein:

the compensation sub-circuit further includes:

a storage capacitor having a first end and a second end, where the first end of the storage capacitor is connected to the light emission control signal line, and where the second end of the storage capacitor is connected to the first node;

a first switch transistor having a control electrode, a first electrode, and a second electrode, where the control electrode of the first switch transistor is connected to the scanning signal line, where the first electrode of the first switch transistor is connected to the second node, and where the second electrode of the first switch transistor is connected to the second node; and a first capacitor having a first end and a second end, where the first end of the first capacitor is connected to the second node, and where the second end of the capacitor is connected to the data signal line;

the driving sub-circuit further includes:

a second switching transistor having a control pole, a first pole, and a second pole, where the control pole of the second switching transistor is connected to the first node, where the first pole of the second switching transistor is connected to the first power line, and where the second pole is connected to the second node; and the light-emitting diode further includes:

a light-emitting element having a first end and a second end, where the first end of the light-emitting element is connected to the second node, and where the second end of the light-emitting element is connected to a second power terminal; and a device capacitor having a first terminal and a second terminal, where the first terminal of the device capacitor is connected to the first end of the light-emitting element, and where the second terminal of the device capacitor is connected to the second end of the light-emitting element.

In another aspect, a display panel is provided, including an amount of M rows and an amount of N columns of the pixel circuits described above, wherein M and N are positive integers; wherein the display panel further includes:

a gate driving circuit;

a data driving circuit;

a first level switching circuit;

a second level switching circuit;

a third level switching circuit;

an amount of fourth level switching circuits corresponding to the amount of M rows; and an amount of fifth level switching circuits corresponding to the amount of N columns;

wherein:

the first level switching circuit is connected to the data driving circuit and each of the first power terminals, and is configured to control each of the first power lines to receive a first power voltage or a reset voltage from the data driving circuit;

the second level switching circuit is connected to the data driving circuit and each of the second power lines, and is configured to control each of the second power lines to receive the first power voltage or the second power voltage;

the third level switching circuit is connected to the data driving circuit and each of the light emission control signal lines, and is configured to control each of the light emission control signal lines to receive the first voltage or the reference voltage from the data driving circuit;

each of the M fourth level switching circuits are provided in a one-to-one correspondence with M rows of scanning signal lines, and each of the fourth level switching circuits is respectively connected to the gate driving circuit and the corresponding scanning signal line, and is configured to control the corresponding scanning signal line to receive the second control voltage or the first control voltage from the gate driving circuit; and each of the N fifth level switching circuits are provided in a one-to-one correspondence with N column data signal lines, and each of the fifth level switching circuits is respectively connected to the data driving circuit and the corresponding data signal line, and is configured to control the corresponding data signal line to receive the data voltage or the reference voltage from the data driving circuit.

In some embodiments, wherein:

the first level switch circuit includes a first voltage switch transistor and a second voltage switch transistor, the first voltage switch transistor includes a first terminal, a second terminal and a control terminal, the data driving circuit includes a reset terminal, a first control signal terminal and a second control signal terminal, wherein the first terminal of the first voltage switch transistor is coupled to the first power line, the second terminal of the first voltage switch transistor is coupled to the reset terminal of the data driving circuit, the control terminal of the first voltage switch transistor is coupled to the first control signal terminal of the data driving circuit, the second voltage switch transistor includes a first terminal, a second terminal and a control terminal, wherein the first terminal of the second voltage switch transistor is coupled to the first power line, the second terminal of the second voltage switch transistor is configured to receive the first power voltage, the control terminal of the second voltage switch transistor is coupled to the second control signal terminal of the data driving circuit.

In some embodiments, wherein:

the second level switch circuit includes a third voltage switch transistor and a fourth voltage switch transistor, the third voltage switch transistor includes a first terminal, a second terminal and a control terminal, the fourth voltage switch transistor includes a first terminal, a second terminal and a control terminal, the data driving circuit includes a fourth control signal terminal, wherein the first terminal of the third voltage switch transistor and the first terminal of the fourth voltage switch transistor are coupled to the second power line, the second terminal of the third voltage switch transistor is configured to receive the first power voltage, the control terminal of the third voltage switch transistor is coupled to the third control signal terminal, the second terminal of the fourth voltage switch transistor is configured to receive the second power voltage, the control terminal of the fourth voltage switch transistor is coupled to the fourth control signal terminal of the data driving circuit.

In some embodiments, wherein:

the third level switch circuit includes a fifth voltage switch transistor and a sixth voltage switch transistor, the fifth voltage switch transistor includes a first terminal, a second terminal and a control terminal, the sixth voltage switch transistor includes a first terminal, a second terminal and a control terminal, the data driving circuit includes a reference voltage signal terminal, a sixth control signal terminal, a first voltage terminal and a fifth control signal, wherein the first terminal of the fifth voltage switch transistor and the first terminal of the sixth voltage switch transistor are coupled to the light emission control signal line, the second terminal of the fifth voltage switch transistor is coupled to the sixth control signal terminal, the control terminal of the fifth voltage switch transistor is coupled to the sixth control signal terminal, the second terminal of the sixth voltage switch transistor is coupled to the first voltage terminal of the data driving circuit, the control terminal of the sixth voltage switch transistor is coupled to the fifth control signal of the data driving circuit.

In some embodiments, wherein:

each of the fourth level switch circuits includes a seventh voltage switch transistor and a eighth voltage switch transistor, the seventh voltage switch transistor includes a first terminal, a second terminal and a control terminal, the eighth voltage switch transistor includes a first terminal, a second terminal and a control terminal, the data driving circuit includes a seventh control signal terminal and a eighth control signal terminal, wherein the first terminal of the seventh voltage switch transistor and the first terminal of the eighth voltage switch transistor are coupled to the scanning signal line, the second terminal of the seventh voltage switch transistor is coupled to the first voltage terminal of the data driving circuit, the control terminal of the seventh voltage switch transistor is coupled to the seventh control signal terminal, the second terminal of the eighth voltage switch transistor is coupled to the gate driving circuit, the control terminal of the eighth voltage switch transistor is coupled to the eighth control signal terminal.

In some embodiments, wherein:

each of the fifth level switch circuits includes a ninth voltage switch transistor and a tenth voltage switch transistor, the ninth voltage switch transistor includes a first terminal, a second terminal and a control terminal, the tenth voltage switch transistor includes a first terminal, a second terminal and a control terminal, the data driving circuit includes a ninth control signal terminal and a tenth control signal terminal, wherein the first terminal of the ninth voltage switch transistor and the first terminal of the tenth voltage switch transistor are coupled to the corresponding data signal line, the second terminal of the ninth voltage switch transistor is coupled to a data signal terminal of the data driving circuit, the control terminal of the ninth voltage switch transistor is coupled to the ninth control signal terminal of the data driving circuit, the second terminal of the tenth voltage switch transistor is coupled to the reference voltage signal terminal of the data driving circuit, the control terminal of the tenth voltage switch transistor is coupled to the tenth control signal terminal of the data driving circuit.

In another aspect, a display apparatus is provided, including: a housing, the housing containing a display panel described above.

In another aspect, a method for driving a pixel circuit is provided, the method including:

in a reset stage, utilizing the scanning signal line to receive the second control voltage, utilizing the light emission control signal line to receive the first voltage, utilizing the data signal line to receive the reference voltage, and utilizing the first power line to receive the reset voltage to reset the pixel circuit;

in a compensation phase, utilizing the first power line to receive the first power voltage, utilizing the light emission control signal line to receive the reference voltage, utilizing the scanning signal line to receive the first control voltage, and utilizing the data signal line to receive the reference voltage to write a threshold voltage of the driving sub-circuit into the compensation sub-circuit; and in a data writing phase, utilizing the first power line to receive the reset voltage, utilizing the light emission control signal line to receive the reference voltage, utilizing the scanning signal line to receive the first control voltage, and the first control voltage is equal to the first voltage, and then utilizing the data signal line to receive a data voltage of a current row.

In some embodiments, the driving method further includes:

in a light-emitting phase, utilizing the second power line to receive a second power supply voltage, so that the light-emitting element is turned on, utilizing the first power line to receive the first power voltage, and where the first power voltage is greater than the second power voltage.

In some embodiments, the compensation sub-circuit includes a first switching transistor, a first capacitor, and a storage capacitor, and the driving sub-circuit includes a second switching transistor; wherein:

in the reset phase, utilizing the light emission control signal line to receive the first voltage to turn on the second switching transistor, and utilizing the scanning signal line to receive the second control voltage to turn off the first switching transistor;

in the compensation phase, utilizing the light-emitting control signal line receives the reference voltage to turn on the second switching transistor, and utilizing the scanning signal line to receive the first control voltage to turn on the first switching transistor; the first power voltage charges the first capacitor and the storage capacitor through the second switching transistor, so that the voltages of the first node and the second node are both equal to the difference of the first power voltage and a threshold voltage of the second switching transistor so as to compensate the compensation sub-circuit.

in the data writing phase, utilizing the first power line to receive the reset voltage, and utilizing the light emission control signal line to receive the reference voltage, so that the second switch is turned off, and the first control voltage is equal to the first voltage when the current line is scanned, so that the first switching transistor is turned on to write the data voltage of the pixel into the storage capacitor.

In some embodiments, the reset voltage satisfies a following relationship:

$$V_{GL} + ELV_{DD} - V_{th} + \frac{C_a \times V_{data} - (C_b + 2C_a) \times V_{ref}}{C_b + C_a} < V_{ini} - V_{th};$$

wherein:

$V_{GL}$ is the first voltage;

$ELV_{DD}$ is the first power voltage;

$V_{th}$ is a threshold voltage of the second switching transistor;

$C_a$ is a capacitance value of the first capacitor;

$V_{data}$ is a data voltage of the current row;

$C_b$ is a capacitance value of the storage capacitor;

$V_{ref}$ is the reference voltage; and $V_{ini}$ is the reset voltage.

It should be noted that the above general description and the following detailed description are merely exemplary and explanatory and should not be construed as limiting of the present disclosure.

DETAILED DESCRIPTION

Figure 1:
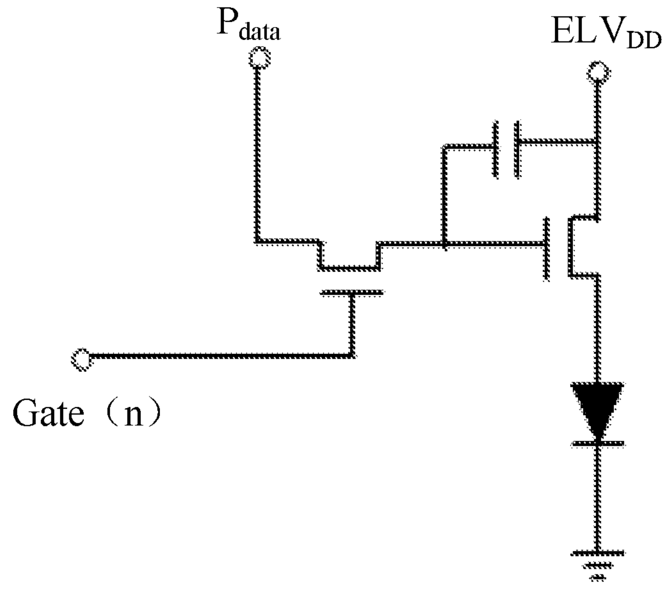
FIG. 1 (PRIOR ART)
FIG. 1 is a schematic structural diagram of a pixel circuit of an organic light-emitting diode in the related art.

Hereinafter, embodiments of the present disclosure will be described in detail. Examples of the embodiments are shown in the drawings, wherein the same or similar reference numerals indicate the same or similar elements or elements having the same or similar functions. The embodiments described below with reference to the drawings are exemplary and are intended to explain the present disclosure, but are made for exemplary purposes only and as such should not be construed as limiting the present disclosure.

Hereinafter, a pixel circuit, a display panel, and a display apparatus according to embodiments of the present disclosure will be described with reference to the drawings.

A pixel circuit of a typical organic light-emitting diode is illustrated in FIG. 1.

As shown here, the pixel circuit can include an organic light-emitting diode, a driving transistor, a capacitor, and a switching transistor.

Utilizing this architecture, when there is a difference in the threshold voltages of the driving transistor from pixel to pixel and the difference exceeds a preset voltage (for example, 0.1V), the driving current of the driving transistor will deviate. This deviation causes variations in the brightness of various pixels within the display thus causing undesired uneven brightness at varying points on the displayed screen.

To prevent the above-mentioned variation in brightness between pixels manufacturers have typically used a method of self-compensation circuit inside or associated with each pixel, but the structure of these self-compensation circuits inside the pixel is burdensome and complicated, and these self-compensating circuits have difficulty in meeting the performance requirements of high resolution implementations of the pixel circuit.

Some examples of these systems can include situations in which the organic light-emitting diode and the driving transistor are connected in series, and wherein the driving transistor is connected to the driving voltage $ELV_{DD}$ of the organic light-emitting diode.

The gate of the driving transistor is then often connected to the data terminal $P_{data}$ representing the gray-scale voltage data through the switching transistor, and the gate of the switching transistor is then often connected to the gate line Gate (n), and the switching transistor can then be controlled so as to turn on or off by controlling the voltage input on the gate line.

In practical applications, a low-level signal can be input on the $n^{th}$ gate line to turn on the switch. At this time, the data signal $V_{data}$ input from the data terminal P data can be written to the gate and capacitor of the driving transistor through the switching transistor. After this line is written, the system can input a high level on the gate line to control the switch to turn off. At this time, the data signal $V_{data}$ can be stored in the capacitor, and the gate voltage of the driving transistor can also be maintained at $V_{data}$.

Among them, according to the transfer characteristics of the driving transistor, the driving current of the driving transistor can be generated by the following formula:

$$I_D = \frac{1}{2}\mu C_{OX}\frac{W}{L}(V_{GS} - V_{TH})^2 = \frac{1}{2}\mu C_{OX}\frac{W}{L}(V_{GS} + |V_{TH}|)^2, \quad (1)$$

Here, $I_D$ is the driving current of the driving transistor, $C_{ox}$ is the oxide layer capacitance of the driving transistor, $V_{GS}$ is the gate-source voltage of the driving transistor, $V_{TH}$ is the threshold capacitance of the driving transistor, and $$\frac{W}{L}$$

is the width-to-length ratio of the driving transistor.

Furthermore, due to $V_{GS}=V_{data}-ELV_{DD}$, formula (1) can be transformed into:

$$I_d = \frac{1}{2}\mu_n C_{OX}\frac{W}{L}(V_{data} - ELV_{DD} - V_{TH})^2, \quad (2)$$

According to formula (2), it will be understood that in the pixel circuit of the organic light-emitting diode, the driving current $I_D$ of the driving transistor has a certain relationship with the threshold voltage $V_{TH}$ of the driving transistor and the power supply voltage $ELV_{DD}$.

Once the threshold voltage $V_{TH}$ of the driving DTFT between pixels differs by more than a preset threshold voltage (e.g., 0.1V), then the driving current of the driving transistor will deviate, thus causing the brightness of the display to be different, which will affect the uniformity of the brightness of the display.

Figure 2:
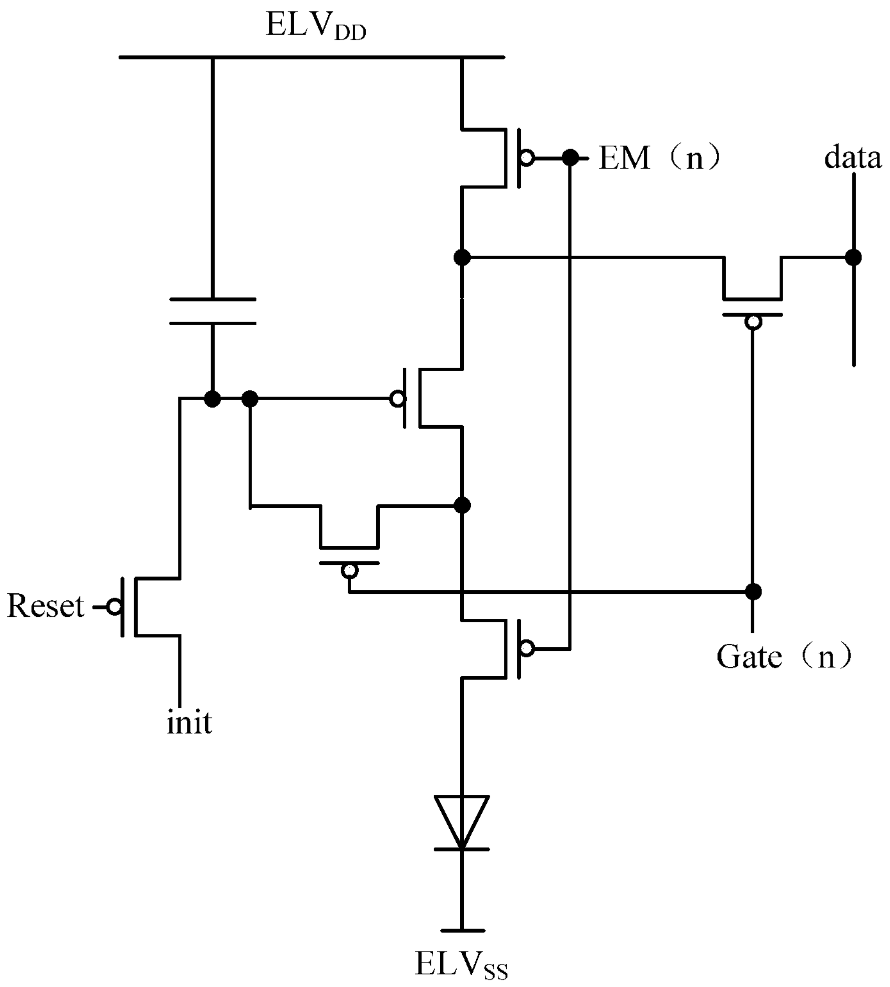
FIG. 2 (PRIOR ART)
FIG. 2 is a schematic structural diagram of a pixel circuit having a pixel internal self-compensation function in the related art.

In the related art, the internal self-compensation method of pixels is usually used to solve the above problems, but the effect is not significant. Moreover, the pixel circuit structure used in this method is relatively complicated. For example, as shown in FIG. 2, this exemplary circuit includes six switch transistors, one capacitor, and six EA signal lines.

Due to the limitation of the pixel space, it may be difficult for the pixel circuit to meet the requirements of high resolution.

Therefore, some embodiments of the present disclosure provide a pixel circuit, which can effectively compensate the threshold voltage of the driving transistor in the pixel circuit such that the driving current of the driving transistor is not affected by the threshold voltage. In this manner the pixel circuit can ensure the uniformity of the driving current of the driving transistor, and thus maintain uniform brightness across all pixels.

The pixel circuit can also provide a simpler structure, which is then more capable of meeting the space demands of the pixel circuits associated with high-resolution applications.

Figure 3:
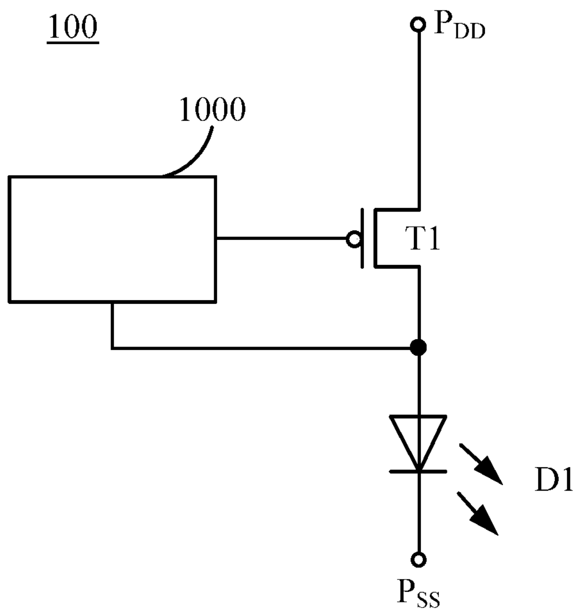
FIG. 3 is a schematic structural diagram of a pixel circuit according to some embodiments of the present disclosure.

FIG. 3 is a schematic structural diagram of a pixel circuit according to some embodiments of the present disclosure being illustrative of various inventive concepts as contained herein.

As shown in FIG. 3, the pixel circuit 100 according to one embodiment of the present disclosure can include a compensation unit 1000, a driving transistor T1 and a light-emitting diode D1.

The various device components, circuits, modules, units, blocks, or portions can have modular configurations, or can be composed of discrete components, but nonetheless may be referred to as "modules" or "units" in general. In other words, the "components," "circuits," "modules," "units," "blocks," or "portions" referred to herein may or may not be provided in modular forms but can also include various alternative integrated configurations.

The first electrode of the driving transistor T1, as illustrated here, can be connected to the first power line $P_{DD}$, and the control electrode and the second electrode of the driving transistor T1 can be respectively connected to the compensation unit 1000. The anode of the light-emitting diode D1 can then be connected to the second electrode of the driving transistor. The cathode of the light-emitting diode D1 can then also be connected to the second power line $P_{SS}$.

Among them, the pixel circuit 100 can pass through the non-light-emitting phase and the light-emitting phase in sequence within a frame time.

In the non-light-emitting phase, the second power line $P_{SS}$ can be utilized so as to input the first power voltage $ELV_{DD}$, in order to turn off the light-emitting diode D1. The compensation unit 1000 can then be configured to adjust the voltage of the control electrode of the driving transistor T1 to be equal to the difference between the first voltage and the threshold voltage of the driving transistor T1. The first voltage can then be equal to the sum of the first power voltage $ELV_{DD}$ and the second voltage, where the second voltage can be independent of the threshold voltage.

In the light-emitting phase, the second power line $P_{SS}$ can be used to input the second power voltage $ELV_{SS}$, such that that the light-emitting diode D1 can then be turned on. The first power line $P_{DD}$ can then be utilized to input the first power supply voltage $ELV_{DD}$, and the first power supply voltage $ELV_{DD}$ will in this instance be greater than the second power supply voltage $ELV_{SS}$.

Specifically, in a frame time, the control process of the pixel circuit can be divided into a non-light-emitting phase and a light-emitting phase. Among them, in the non-light-emitting stage, a large voltage value can be input through the second power line $P_{SS}$ so as to ensure that the light-emitting diode D1 is turned off. In other words, the light-emitting diode D1 can be controlled to not emit light.

In such instances, the voltage of the control electrode of the driving transistor T1 can be adjusted so as to be equal to the difference between the first voltage and the threshold voltage of the driving transistor T1 through the compensation unit 1000 in order to ensure that the obtained drive current of the drive transistor T1 in a light-emitting phase is independent of the threshold voltage.

Therefore, the threshold voltage of the driving transistor in the pixel circuit can be effectively compensated, so that the driving current of the driving transistor is not affected by the threshold voltage. In this manner, the uniformity of the driving current of the driving transistor can be ensured. In addition, the pixel circuit 100 as shown here, can be composed of only the illustrated compensation unit 1000, driving transistor T1, and light-emitting diode D1, and thus has a simple structure, which allows the pixel circuit to be more compact and thus more in-line with the requirements of the pixel circuit in high resolution applications.

Figure 4:
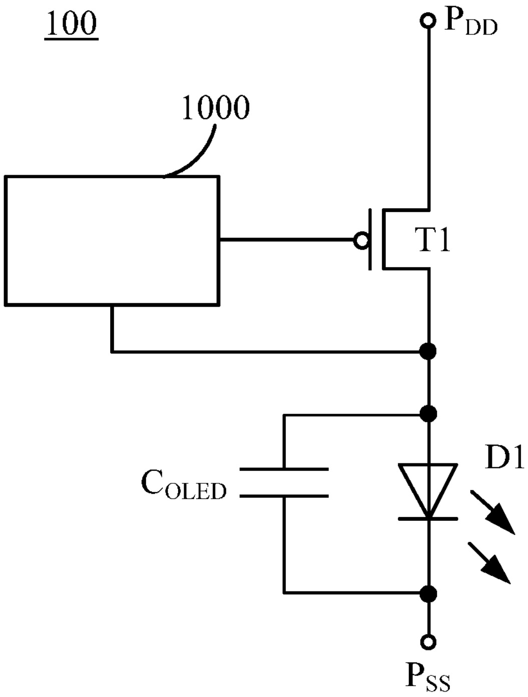
FIG. 4 is a schematic structural diagram of a pixel circuit according to some embodiments of the present disclosure.

It should be noted that, in some applications, a junction capacitance exists between the diode's PN junction. Therefore, in practical applications, as shown in FIG. 4, the light-emitting diode D1 can be equivalent to the light-emitting diode D1 and the light-emitting diode device capacitor $C_{OLED}$, i.e. the junction capacitance of the light-emitting diode D1, can be connected in parallel.

Figure 5:
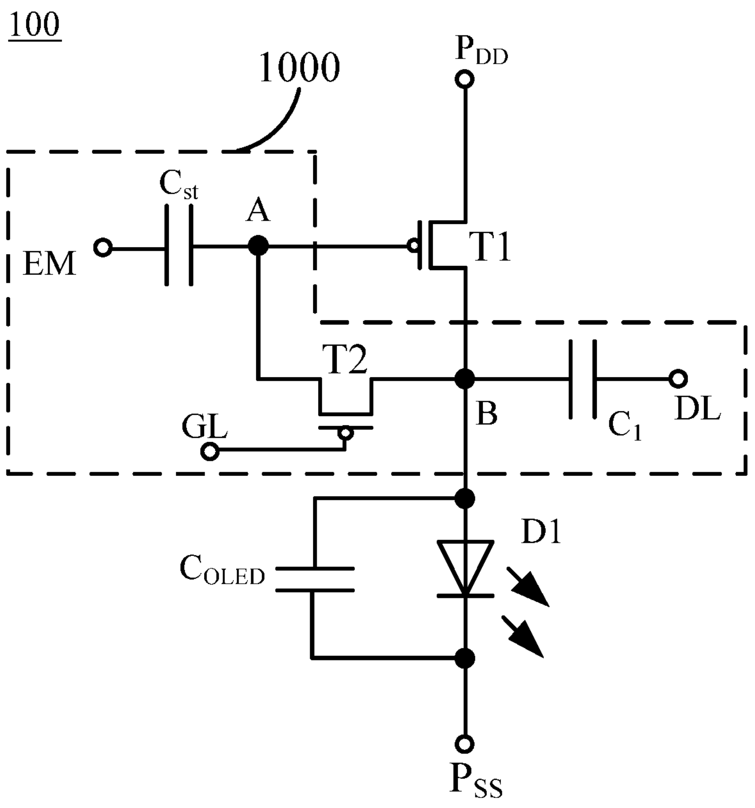
FIG. 5 is a schematic structural diagram of a pixel circuit according to another embodiment of the present disclosure.

According to some additional embodiments of the present disclosure, and as shown in FIG. 5, the compensation unit 1000 can include a storage capacitor $C_{st}$, a first switching transistor T2, and a capacitor $C_1$.

The first end of the storage capacitor $C_{st}$, and as illustrated here, can be connected to the control light-emitting data line EM, and the second end of the storage capacitor $C_{st}$ can be connected to the control electrode of the driving transistor T1.

The control electrode of the first switching transistor T2 can then be connected to the scanning line GL, the first electrode of the first switch transistor T2 can be connected to the second end of the storage capacitor $C_{st}$, and the second electrode of the first switching transistor T2 can then be connected to the second electrode of the driving transistor T1.

The first end of the capacitor $C_1$ can also be connected to the second electrode of the driving transistor T1, and the second end of the capacitor $C_1$ can be connected to the data line DL.

In an exemplary scenario, for example in the non-light-emitting phase, the pixel circuit 100 can sequentially pass through the following phases: a reset phase, a threshold voltage writing phase, and a data writing phase.

In the reset stage, the first power line $P_{DD}$ can be used to input a reset voltage $V_{ini}$. In this stage, the reset voltage $V_{ini}$ can be less than the first power voltage $ELV_{DD}$. The control light-emitting data line EM can then be used to input a first control voltage $V_{GL}$ to turn on the driving transistor T1.

The scanning line GL can then be used to input a second control voltage $V_{GH}$ to turn off the first switch T2, wherein the second control voltage $V_{GH}$ will be greater than the first control voltage $V_{GL}$. The data line DL can then be utilized to input a reference voltage $V_{ref}$.

In the threshold voltage writing phase, the first power line $P_{DD}$ can be used to input the first power voltage $ELV_{DD}$, and the control light-emitting data line EM can be used to input the reference voltage $V_{ref}$ to turn on the driving transistor T1. In this instance, the reference voltage $V_{ref}$ can be greater than the first control voltage $V_{GL}$. The scanning line GL can then be used to input a first control voltage $V_{GL}$ so that the first switch T2 is turned on, and the data line DL can then be utilized to input a reference voltage $V_{ref}$.

In the data writing phase, the first power line $P_{DD}$ can be used to input the reset voltage $V_{ini}$, wherein the control light-emitting data line EM can be utilized to input the reference voltage $V_{ref}$ to turn off the driving transistor T1, and wherein the scanning line GL can be utilized to input the scanning voltage $G_n$. When the current row is scanned, the scanning voltage $G_n$, should be equal to the first control voltage $V_{GL}$, and the data line DL can then be used to input the data voltage $V_{data}$ of the current row.

According to some embodiments of the present disclosure, the reset voltage satisfies the following relationship:

$$V_{GL} + ELV_{DD} - V_{th} + \frac{C_a \times V_{data} - (C_b + 2C_a) \times V_{ref}}{C_b + C_a} < V_{ini} - V_{th},$$

wherein, in this relationship $V_{GL}$ represents the first control voltage; $ELV_{DD}$ represents the first power supply voltage; $V_{th}$ represents the threshold voltage of the driving transistor; $C_a$ represents the capacitance of the capacitor $C_1$; $V_{data}$ represents the data voltage of the current row; $C_b$ represents the capacitance of the storage capacitor $C_{st}$; $V_{ref}$ represents the reference voltage; and wherein $V_{ini}$, represents the reset voltage.

According to some embodiments of the present disclosure, the first switching transistor T2 can be a P-type metal oxide semiconductor transistor or a P-type thin film transistor.

Specifically, in practical applications, the non-light-emitting phase can be further divided into three phases, that is, a reset phase, a threshold voltage writing phase, and a data writing phase. In other words, the working process of the pixel circuit 100 can be divided into four operational phases in sequence, namely a reset phase, a threshold voltage writing phase, a data writing phase, and a light-emitting phase.

Figure 6:
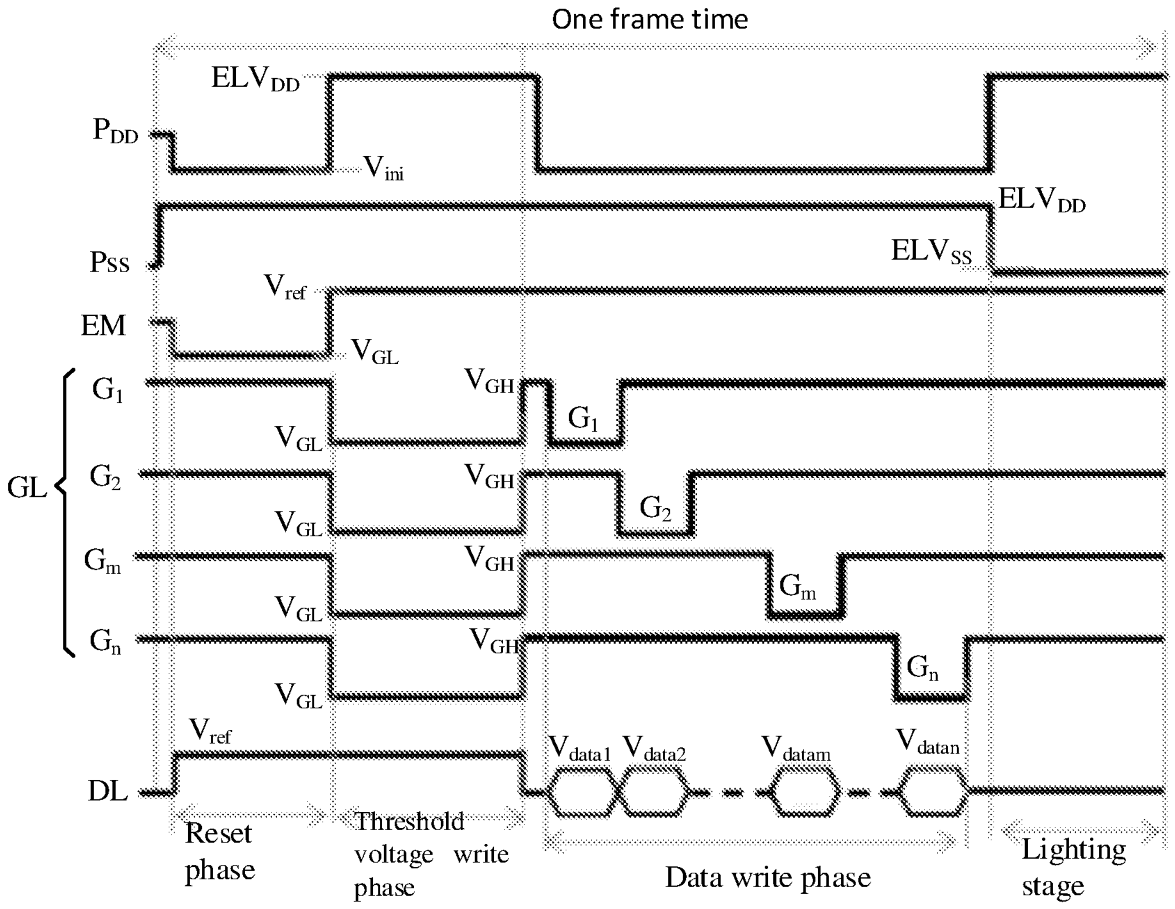
FIG. 6 is a timing diagram of voltage signals that need to be input at different stages of the first power line $P_{DD}$, the second power line $P_{SS}$, the control light-emitting data line EM, the scanning line GL, and the data line DL according to some embodiments of the present disclosure.

Correspondingly, within one-time frame, the timing diagrams of the voltage signals that the first power line $P_{DD}$, the second power line $P_{SS}$, the control light-emitting data line EM, the scanning line GL, and the data line DL need to input at different stages can be shown in FIG. 6.

Specifically, during the reset phase, the first power supply voltage $ELV_{DD}$ can be input through the second power line $P_{SS}$, or in other words, the high-level voltage can be input, so that the light-emitting diode D1 is continuously in an off state to ensure that the light-emitting diode D1 cannot emit light.

At this time, the second control voltage $V_{GH}$ can be input through the scanning line GL, that is, the high-level voltage can be input, so that the first switch T2 is turned off.

In addition, the first control voltage $V_{GL}$ can be input through the control light-emitting data line EM, or in other words, the low level can be input so as to ensure that the driving transistor T1 is continuously in a conducting state. At the same time, the reference voltage $V_{ref}$ can be input through the data line DL.

Figure 7:
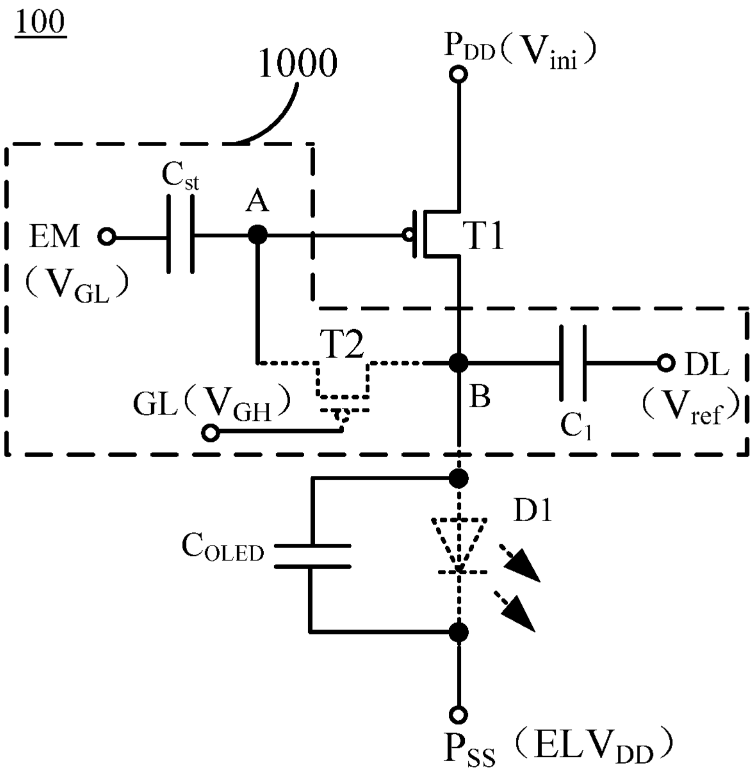
FIG. 7 is a schematic diagram of the operating states of various devices in a pixel circuit during a reset phase according to some embodiments of the present disclosure.

In the reset phase, the working state of each device in the pixel circuit 100 can be as shown in FIG. 7, wherein the dotted line in FIG. 7 indicates the off state, and the solid line indicates the on state.

At this time, the reset voltage $V_{ini}$, input from the first power line $P_{DD}$ can be input to the capacitor $C_1$ and the light-emitting diode device capacitor $C_{OLED}$ through the driving transistor T1.

From this, the level of point A can be generated by the following formula:

$$V_A = V_{GL} + ELV_{DD} - V_{th} + \frac{C_a \times V_{data} - (C_b + 2C_a) \times V_{ref}}{C_b + C_a}, \quad (3)$$

Wherein $V_A$ represents the level of point A, $V_{GL}$ represents the first control voltage, $ELV_{DD}$ represents the first power supply voltage, $V_{th}$ represents the threshold voltage of driving transistor T1, $C_a$ represents the capacitance of capacitor $C_1$, $V_{data}$ represents the data voltage of the current row, $C_b$ represents the capacitance of the storage capacitor $C_{st}$, and $V_{ref}$ represents the reference voltage.

It can be understood that, in the reset stage, in order to ensure that the driving transistor T1 maintains a conducting state, the threshold voltage $V_{th}$ of the driving transistor T1, the level $V_A$ of the A point, and the reset voltage $V_{ini}$, can be controlled according to the conduction conditions of the driving transistor T1 to meet relationship:

$$V_{ini} - V_A > V_{th} \quad (4)$$

By combining formula (3) and processing relationship (4), we can get relationship (5), as illustrated here:

$$V_{GL} + ELV_{DD} - V_{th} + \frac{C_a \times V_{data} - (C_b + 2C_a) \times V_{ref}}{C_b + C_a} < V_{ini} - V_{th}, \quad (5)$$

That is, in the reset phase, the reset voltage $V_{ini}$ can be controlled to satisfy the relationship (5) to ensure that the driving transistor T1 maintains the on state, so that the reset voltage $V_{ini}$ input by the first power line $P_{DD}$ can be input to the capacitor $C_1$ and the light-emitting diode device capacitor $C_{OLED}$ through the driving transistor T1. After the reset phase ends, the voltage at point B can be the reset voltage $V_{ini}$. In general, the reset voltage $V_{ini}$ can be set to a negative voltage, for example, it can be −3V.

In the threshold voltage writing stage, writing the threshold voltage $V_{th}$ of the driving transistor T1 into each capacitor in the pixel circuit 100 can then be realized. Specifically, in the threshold voltage writing stage, the first power voltage $ELV_{DD}$ can be still input through the second power line $P_{SS}$, that is, the high-level voltage can be input, so that the light-emitting diode D1 is continuously in an off state so as to ensure that the light-emitting diode D1 will not emit light.

At this time, the first power supply voltage $ELV_{DD}$ can be input through the first power line $P_{DD}$, and the first control voltage $V_{GL}$ can be input through the scanning line GL. In other words, the low level can be input so as to ensure that the first switch T2 is continuously turned on.

Figure 8:
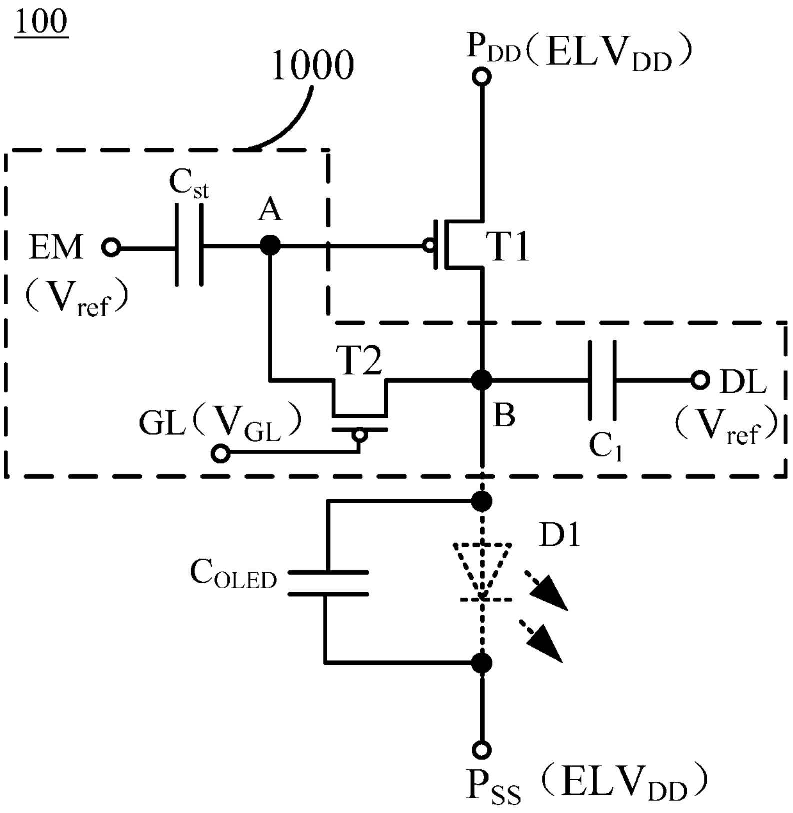
FIG. 8 is a schematic diagram of the operating states of various devices in a pixel circuit during a threshold voltage writing stage according to some embodiments of the present disclosure.

FIG. 8 illustrates an exemplary configuration of the pixel circuit in the threshold voltage writing stage. As illustrated here, the working states of the devices in the pixel circuit 100 are shown wherein the dotted line in FIG. 8 indicates the off state, and the solid line indicates the on state.

In this instance, because the reference voltage $V_{ini}$ has been written to point B during the reset phase, and the reference voltage $V_{ini}$ is set to a negative voltage, when the first switch T2 is turned on, the reference voltage $V_{ref}$ can be input by the control light-emitting data line EM and the data line DL, such that that the voltages at points A and B are less than the difference between the first power voltage $ELV_{DD}$ and the threshold voltage $V_{th}$ of the driving transistor T1.

At this time, the first power supply voltage $ELV_{DD}$ can be charged to the capacitor $C_1$, the light-emitting diode device capacitor $C_{OLED}$, and the storage capacitor $C_{st}$ through the driving transistor T1. When the voltage at point A and the capacitance at point B are both equal to the difference between the first power supply voltage $ELV_{DD}$ and the threshold voltage $V_{th}$ of the driving transistor T1, that is, $V_A = V_B = ELV_{DD} - V_{th}$, the driving transistor T1 is turned off.

At this time, the charge $Q_{cst}$, which stored on the storage capacitor $C_{st}$, can be $C_b \times (ELV_{DD} - V_{th} - V^{ref})$, that is $Q_{cst}=C_b\times(ELV_{DD}-V_{th}-V_{ref})$, the charge $Q_{c1}$ can then be stored on the capacitor $C_1$, which can be $C_a\times(ELV_{DD}-V_{th}-V_{ref})$, that is $Q_{c1}=C_a\times(ELV_{DD}-V_{th}-V_{ref})$, the charge $Q_{COLED}$ can then be stored on the light-emitting diode device capacitor $C_{OLED}$ which can be $-C_c\times V_{th}$, that is $Q_{COLED}=-C_c\times V_{th}$. In this manner, the total charge $Q_A$ at point A and the total charge $Q_B$ at point B can be generated by the following formula:

$$Q_A=Q_B=C_b\times(ELV_{DD}-V_{th}-V_{ref})+C_a\times(ELV_{DD}-V_{th}-V_{ref})-C_c\times V_{th} \quad (6)$$

Wherein, $Q_A$ represents the total charge at the current point A, $Q_B$ represents the total charge at the current point B, $C_b$ represents the capacitance of the storage capacitor $C_{st}$, $ELV_{DD}$ represents the first power supply voltage, $V_{th}$ represents the threshold voltage of the driving transistor T1, $V_{ref}$ represents the reference voltage, $C_a$ represents the capacitance value of the capacitor $C_1$, and wherein $C_c$ represents the capacitance value of the light-emitting diode device capacitor $C_{OLED}$.

For exemplary purposes, in the data writing stage, the grayscale data voltage $V_{data}$ of the pixel is mainly written into the storage capacitor $C_{st}$, and grayscale data voltage $V_{data}$ can be superimposed on the threshold voltage $V_{th}$ written in the threshold voltage writing stage.

Specifically, the first power voltage $ELV_{DD}$ can still be input through the second power line $P_{SS}$, that is, the high-level voltage can be input, such that the light-emitting diode D1 is continuously in an off state so as to ensure that the light-emitting diode D1 cannot emit light.

At this time, the first power line $P_{DD}$ can be configured such that it inputs the reset voltage $V_{ini}$, and the reference voltage $V_{ref}$ is input through the control light-emitting data line EM, so that the driving transistor T1 is turned off.

Further, the scanning voltage $G_n$ can be input through the scanning line GL, where the scanning voltage $G_n$ can be configured to be equal to the first control voltage $V_{GL}$ when scanning to the pixels of the current row. In other words, when the scanning voltage $G_n$ scans to a pixel with a set number of lines, the scanning voltage $G_n$ of the current row can be set to the first control voltage $V_{GL}$ so as to control the first switch T2 to be turned on.

At the same time, the gray-scale data voltage \Taman of the pixels of the current row can be input through the data line DL.

For example, when scanning to the first row, correspondingly, the scanning voltage $G_1$ in the first row can be equal to the first control voltage $V_{GL}$ so as to control the first switch T2 to be turned on. At the same time, the gray-scale data voltage $V_{data1}$ of the pixels in the first row can be input through the data line DL.

When scanning to the second row, correspondingly, the scanning voltage $G_2$ in the second row can be equal to the first control voltage $V_{GL}$ so as to control the first switch T2 to be turned on. At the same time, the gray-scale data voltage $V_{data2}$ of the pixels in the second row can be input through the data line DL.

When the $m^{th}$ row is then scanned, correspondingly, the scanning voltage $G_m$ of the $m^{th}$ row can be configured so as to be equal to the first control voltage $V_{GL}$ so as to control the first switch T2 to be turned on. At the same time, the gray-scale data voltage $V_{datam}$ of the pixels of the $m^{th}$ row can be input through the data line DL.

Figure 9:
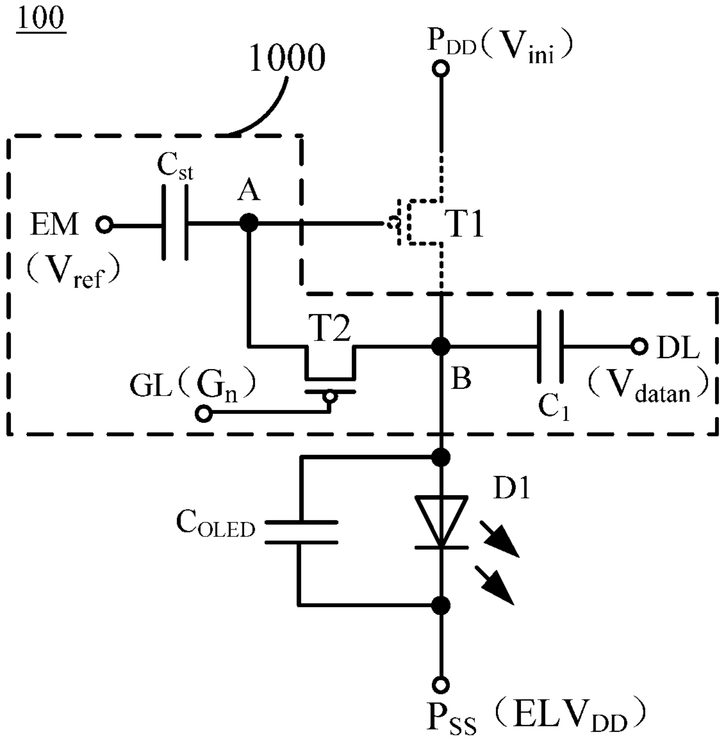
FIG. 9 is a schematic diagram of operation states of various devices in a pixel circuit during a data writing stage according to some embodiments of the present disclosure.

As shown in FIG. 9, which illustrates the pixel circuit in the data writing stage in a working state of each device controlled by the pixel circuit 100 wherein the dotted line in FIG. 9 indicates the off state, and the solid line indicates the on state.

As illustrated here, when the first switch T2 is turned on, the data voltage $V_{data}$ can be input through the data line DL which can then redistribute the charge between the capacitor $C_1$, the light-emitting diode device capacitor $C_{OLED}$, and the storage capacitor $C_{st}$, where the total charge at points A and B remains the same. This can be illustrated by the following relationship:

$$C_b\times(V_A-V_{ref})+C_a\times(V_B-V_{data})+C_c\times(V_B-ELV_{DD})=(C_b+C_a)\times(ELV_{DD}-V_{th}-V_{ref})-C_c\times V_{th}, \quad (7)$$

Since $V_A=V_B$, by simplifying formula (7), the voltage at point A can be obtained in which:

$$V_A = ELV_{DD} - V_{th} + \frac{C_a\times(V_{data}-V_{ref})}{C_b+C_a+C_c}, \quad (8)$$

In these expressions a first voltage can be expressed as:

$$ELV_{DD} + \frac{C_a\times(V_{data}-V_{ref})}{C_b+C_a+C_c},$$

and a second voltage can be expressed as:

$$\frac{C_a\times(V_{data}-V_{ref})}{C_b+C_a+C_c}.$$

After passing through the reset phase, the threshold voltage writing phase, and the data writing phase in sequence, the voltage of the control electrode of the driving transistor T1, in other words, the voltage at point A, is adjusted to be equal to the difference between the first voltage and the threshold voltage $V_{th}$ of the driving transistor T1, where the first voltage is then equal to the sum of the first power supply voltage and the second voltage.

In the light-emitting phase, the reference voltage $V_{ref}$ input by the control light-emitting data line EM and the charge stored in the storage capacitor $C_{st}$ can be used to maintain the gate voltage, i.e., voltage of the control electrode, of the driving transistor T1 unchanged. In other words, the voltage at point A $V_A$ is maintained as the same, and thus drive the driving transistor T1 so as to generate a driving current $I_{DS}$ under the gate voltage.

Specifically, the second power supply voltage $ELV_{SS}$ can be input through the second power supply line $P_{SS}$, or in other words, the low-level voltage is input, so that the light-emitting diode D1 is then maintained in an on state.

At this time, the first power supply voltage $ELV_{DD}$ can be input through the first power supply line $P_{DD}$, and a reference voltage $V_{ref}$ can be input to the control light-emitting data line EM, such that the driving transistor T1 is turned on, and a second control voltage $V_{GH}$ can be input through the scanning line GL, so that the first switching transistor T2 is turned off.

Figure 10:
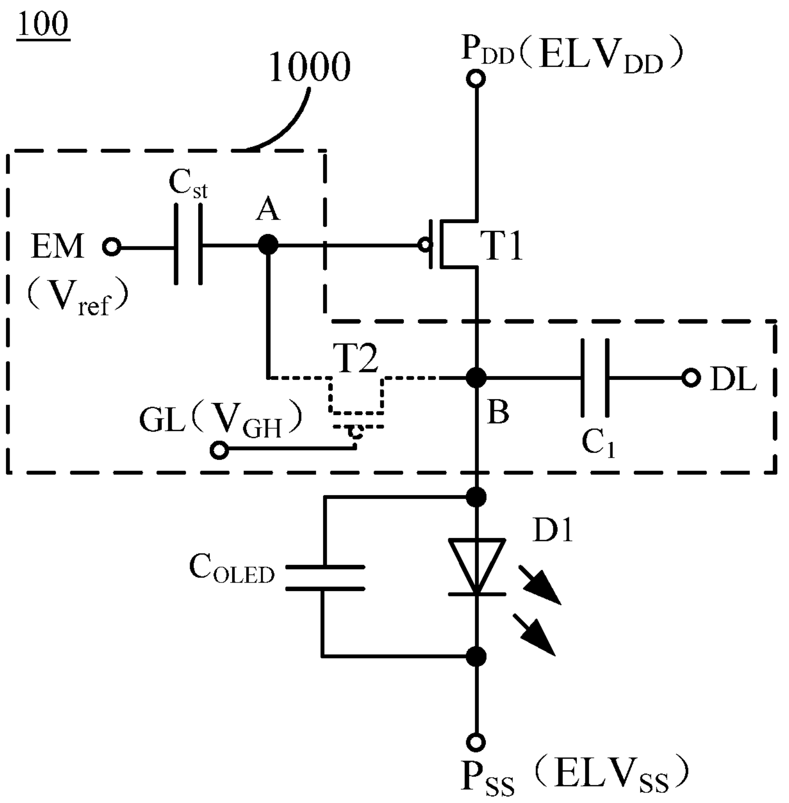
FIG. 10 is a schematic diagram of operation states of various devices in a pixel circuit in a light-emitting stage according to some embodiments of the present disclosure.

Illustrated in FIG. 10 is the light-emitting stage of the device, wherein the working states of the devices in the pixel circuit 100 are shown, wherein the dotted line in FIG. 10 indicates the off state, and the solid line indicates the on state. During the data writing phase and the light-emitting phase, and after the data writing phase is completed which is enabled because the control light-emitting data line EM is maintained at the reference voltage $V_{ref}$. In this phase, the first switch T2 is turned off, so the voltage at point A can be maintained the same. This voltage at point a can be described as follows:

$$V_A = ELV_{DD} - V_{th} + \frac{C_a \times (V_{data} - V_{ref})}{C_b + C_a + C_c}.$$

At this time, the gate-source voltage $V_{GS}$ of the driving transistor T1 can be generated by the following formula:

$$V_{GS} = V_A - ELV_{DD} = -V_{th} + \frac{C_a \times (V_{data} - V_{ref})}{C_b + C_a + C_c}. \quad (9)$$

Therefore, the driving current $I_{DS}$ of the driving transistor T1 can be generated by the following formula:

$$I_{DS} = \frac{1}{2}\mu_p C_{OX}\frac{W}{L}(V_{GS} + V_{th})^2 = \frac{1}{2}\mu_p C_{OX}\frac{W}{L}\left(\frac{C_a}{C_b + C_a + C_c}\right)^2 (V_{data} - V_{ref})^2. \quad (10)$$

According to formula (10), it can be known that the driving current $I_{DS}$ of the driving transistor is independent of the threshold voltage $V_{th}$ of the driving transistor, thereby achieving compensation for the threshold voltage of the driving transistor.

In another embodiment of the present disclosure, a pixel circuit is contemplated which is composed of a driving transistor T1, a first switching transistor T2, a capacitor $C_1$, a light-emitting diode device capacitor $C_{OLED}$, and a storage capacitor cst, can be implemented in combination with the above-mentioned control method such that the threshold voltage $V_{th}$ of the driving transistor T1 is effectively compensated.

This driving transistor compensation facilitates a driving of the driving current $I_{DS}$ of the driving transistor T1 which is not affected by the threshold voltage $V_{th}$, thereby ensuring the uniformity of the driving current of the driving transistor T1. The pixel circuit structure contemplated as such is simple, takes up less space due to the reduction of components, which renders it more in-line with the needs of pixel circuits with high resolution or density.

Figure 11:
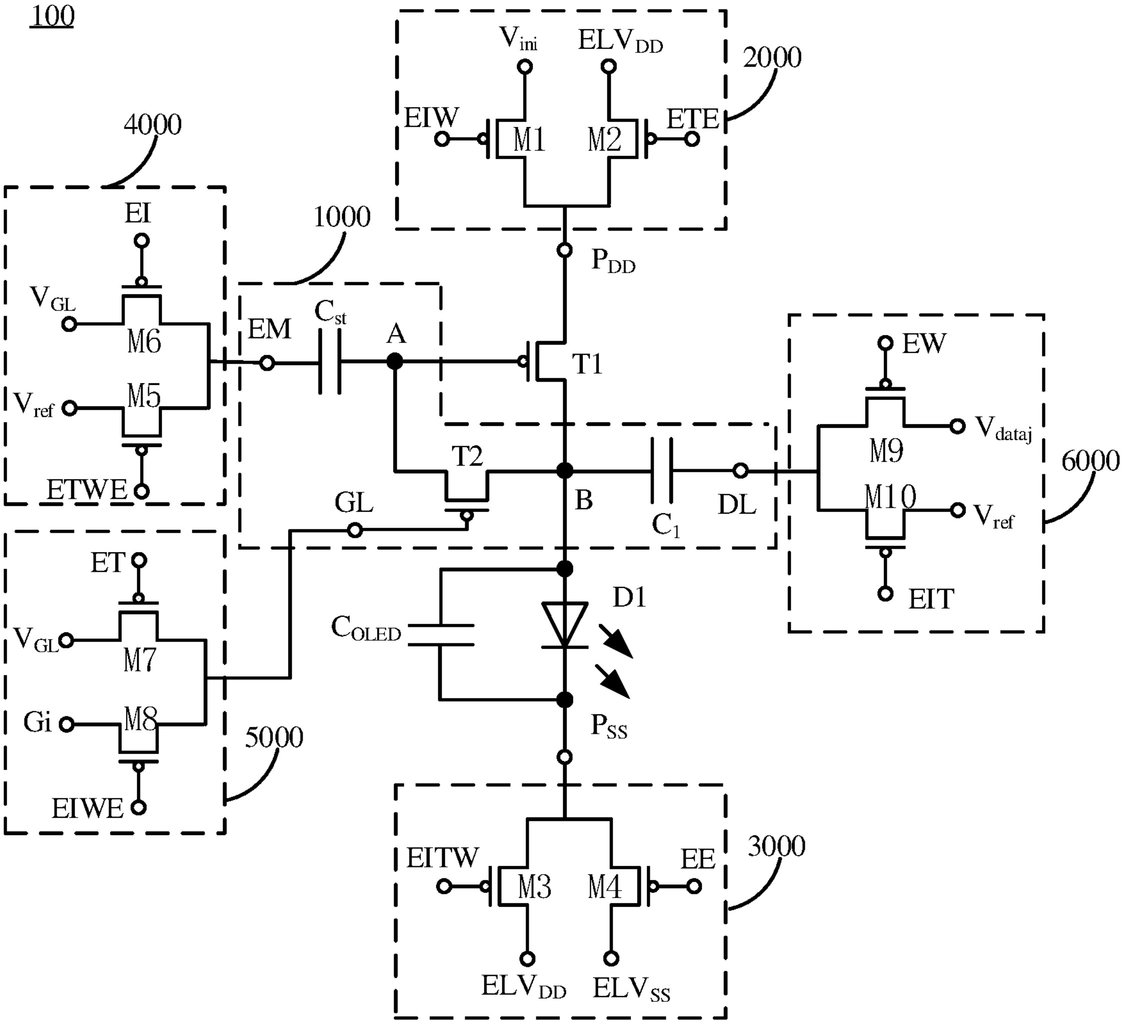
FIG. 11 is a schematic structural diagram of a pixel circuit according to another embodiment of the present disclosure.

According to some embodiments of the present disclosure, as shown in FIG. 11, in which the pixel circuit 100 can further include a first level switching circuit 2000, a second level switching circuit 3000, a third level switching circuit 4000, and a fourth level switching circuit 5000, and a fifth level switching circuit 6000.

In this embodiment, the first level switching circuit 2000 can be used to control the input signal of the first power line $P_{DD}$ such that the switching circuit 2000 can be utilized so as to switch between the reset voltage Vim and the first power voltage $ELV_{DD}$.

Additionally, the second level switching circuit 3000 can be used to control the input signal of the second power line $P_{SS}$ to switch between the first power voltage $ELV_{DD}$ and the second power voltage $ELV_{SS}$.

Further, the third level switching circuit 4000 can then be used to control the input signal of the control light-emitting data line EM to switch between the reference voltage $V_{ref}$ and the first control voltage $V_{GL}$.

The fourth level switching circuit 5000 can then be used to control the input signal of the scanning line GL to switch between the first control voltage $V_{GL}$ and the scanning voltage $G_n$. Finally, the fifth level switching circuit 6000 can be used to control the input signal of the data line DL to switch between the reference voltage $V_{ref}$ and data voltage $V_{data}$.

According to some embodiments of the present disclosure, and as also shown in FIG. 11, the first level switching circuit 2000, the second level switching circuit 3000, the third level switching circuit 4000, the fourth level switching circuit 5000, and the fifth level switching circuit 6000 can each include two switching transistors, respectively.

According to some embodiments of the present disclosure, one or more of the first level switching circuit 2000, the second level switching circuit 3000, the third level switching circuit 4000, the fourth level switching circuit 5000, and the fifth level switching circuit 6000 can optionally be set in a set area near the operable area, or alternatively integrated into the driver chip.

Specifically, according to the foregoing embodiment, it will be understood that the first power line $P_{DD}$, the second power line $P_{SS}$, the control light-emitting data line EM, the scanning line GL, and the data line DL can be configured to input different voltages at different stages in order to realize the internal compensation function of the pixel circuit.

Therefore, as a possible implementation, at different stages, the first to fifth level switching circuits can be used to select different associated voltage input with corresponding ports in order to implement the internal compensation function of the pixel circuit.

Specifically, as shown in FIG. 11, two switching transistors can be respectively provided in the first to fifth level switching circuits, wherein a first electrode of one switching transistor can be connected to the power line $P_{DD}$ in the first level switching circuit 2000, the second electrode can then be connected to the reset voltage $V_{ini}$, and the control electrode can then be connected to the first control signal EIW.

The first electrode of the other switching transistor in the first level switching circuit 2000 can then be connected to the first power line $P_{DD}$. The second electrode in this embodiment can be connected to the first power voltage $ELV_{DD}$, and the control electrode finally be connected to the second control signal ETE.

The first electrode of a switching transistor in the second level switching circuit 3000 can then be connected to the second power line $P_{SS}$, the second electrode can be connected to the first power voltage $ELV_{DD}$, and the control electrode can finally be connected to the third control signal EITW.

The first electrode of the other switch can be provided, for example, in the second level switching circuit 3000 which can then be connected to the second power line $P_{SS}$, wherein the second electrode can be connected to the second power voltage $ELV_{SS}$, and the control electrode can be connected to the fourth control signal EE.

In this exemplary embodiment, a first electrode of a switching transistor in the third level switching circuit 4000 can be connected to the control light-emitting data line EM, a second electrode can then be connected to the first control voltage $V_{GL}$, and a control electrode can be connected to the fifth control signal EI.

In this exemplary embodiment, the first electrode of the other switch in the third level switching circuit 4000 can then be connected to the control light-emitting data line EM, the second electrode can be connected to the reference voltage $V_{ref}$, and the control electrode can be connected to the sixth control signal ETWE.

In this exemplary embodiment, a first electrode of a switching transistor in the fourth level switching circuit 5000 can be connected to the scanning line GL, a second electrode can be connected to the first control voltage $V_{GL}$, and a control electrode can be connected to the seventh control signal ET.

In this exemplary embodiment, the first electrode of the other switching transistor in the fourth level switching circuit 5000 can be connected to the scanning line GL, the second electrode can then be connected to the scanning voltage $G_n$, and the control electrode can be connected to the eighth control signal EIWE.

In this exemplary embodiment, a first electrode of a switching transistor in the fifth level switching circuit 6000 can be connected to the data line DL, a second electrode can be connected to the data voltage $V_{data}$, and a control electrode can then be connected to the ninth control signal EW.

In this exemplary embodiment, the first electrode of the other switching transistor in the fifth level switching circuit 6000 can be connected to the data line DL, the second electrode can be connected to the reference voltage $V_{ref}$, and the control electrode can then be connected to the tenth control signal EIT.

In practical applications, by controlling the control signal input to the control electrodes of each switching transistor in the first to fifth level switching circuits, the switching transistor can be controlled in a manner so as to be turned on or off, thus, the first to fifth level switching circuits can be utilized to select different voltage input corresponding ports.

Among them, within a given frame time, the timing diagram of the voltage signals that need to be input for the first to tenth control signals are as follows: the first power line $P_{DD}$, the second power line $P_{SS}$, the control light-emitting data line EM, the scanning line GL, and the data line DL. Each of these voltage signals are provided at different associated stages which can be shown in FIG. 12.

Figure 12:
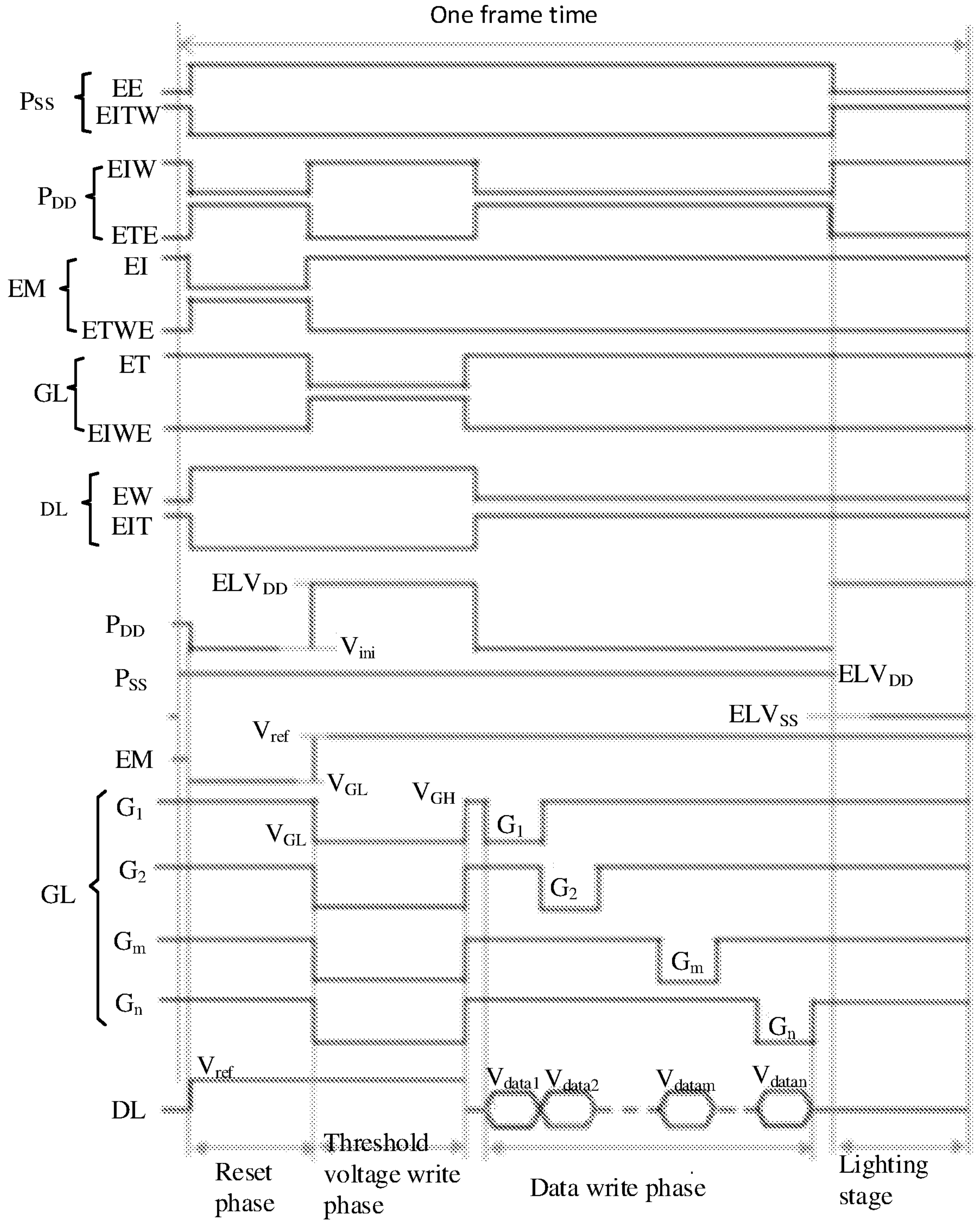
FIG. 12 is a timing diagram of voltages signals that need to be input at different stages of the first to tenth control signals and the first power line $P_{DD}$, the second power line $P_{SS}$, the control light-emitting data line EM, the scanning line GL and the data line DL according to some embodiments of the present disclosure.

Specifically, as shown in FIG. 11 and FIG. 12, during the reset phase, the first control signal EIW can be set to a low level, so that the corresponding switch is turned on, and the second control signal ETE can thus be set to a high-level voltage. In turn, the corresponding switch is turned off, and the reset voltage $V_{ini}$ is input to the first power line $P_{DD}$.

The third control signal EITW can be set to a low-level voltage so as to turn on the corresponding switch, and the fourth control signal EE is set to a high-level voltage so as to turn off the corresponding switch, so that the second power line $P_{SS}$ is input as the first power supply voltage $ELV_{DD}$.

The fifth control signal EI can be set to a low-level voltage so as to turn on the corresponding switch, and the sixth control signal ETWE can be set to a high-level voltage so as to turn off the corresponding switch, so that the control light-emitting data line EM is input to the first A control voltage $V_{GL}$; and the seventh control signal ET can thus be set to a high-level voltage so as to turn off the corresponding switch transistor.

The eighth control signal EIWE can be set to a low-level voltage so as to turn on the corresponding switch transistor, thereby enabling scanning line GL to input the scanning voltage $G_n$.

In the reset phase, the scanning voltage $G_n$ can be equal to the second control voltage $V_{GH}$; and the ninth control signal EW can be set to a high-level voltage so as to turn off the corresponding switch, and the tenth control signal EIT can then be set to a low-level voltage such that the corresponding switch transistor is turned on, and the reference voltage $V_{ref}$ is input to the data line DL.

Therefore, the reset function can be implemented. For a specific implementation process, refer to the foregoing embodiment. To avoid redundancy, details are not described herein again.

In the threshold voltage writing stage, the first control signal EIW can be set to a high-level voltage in order to turn off the corresponding switch, and the second control signal ETE can then be set to a low-level voltage in order to turn on the corresponding switch, so that the first power line $P_{DD}$ inputs the first power voltage $ELV_{DD}$.

The third control signal EITW can be set to a low-level voltage in order to turn on the corresponding switch, and the fourth control signal EE can then be set to a high-level voltage in order to turn off the corresponding switch. In this manner the second power line $P_{SS}$ inputs the first power voltage $ELV_{DD}$.

Additionally, the fifth control signal EI can be set to a high-level voltage in order to turn off the corresponding switch, and the sixth control signal ETWE can then be set to a low-level voltage in order to turn on the corresponding switch, so that the control light-emitting data line EM input a reference voltage $V_{ref}$; and the seventh control signal ET can then be set to a low-level voltage in order to turn on the corresponding switch, and the eighth control signal EIWE can then be set to a high level to turn off the corresponding switch.

Therefore, the scanning line GL can be configured to input with the first control voltage $V_{GL}$; and the ninth control signal EW can be set to a high-level voltage in order to turn off the corresponding switch, and the tenth control signal EIT can be set to a low-level voltage in order to turn on the corresponding switch, so that the data line DL inputs a reference voltage $V_{ref}$.

Therefore, the function of writing the threshold voltage of the driving transistor into each capacitor in the pixel circuit can be implemented in a uniform manner. For a specific implementation process, refer to the foregoing embodiment. To avoid redundancy, details are not described herein.

In the data writing stage, the first control signal EIW can be set to a low level to make the corresponding switch transistor conductive, and the second control signal ETE can be set to a high level to make the corresponding switch transistor turn off, so that the first power line $P_{DD}$ inputs a reset voltage $V_{ini}$.

The third control signal EITW can be set to a low-level voltage in order to turn on the corresponding switch, and the fourth control signal EE can then be set to a high-level in order to turn off the corresponding switch. Thus, the second power line $P_{SS}$ can be configured to input the first power voltage $ELV_{DD}$. In addition, in such instances the fifth control signal EI can then be set to a high-level voltage so as to turn off the corresponding switch.

The sixth control signal ETWE can be set to a low-level voltage such that the corresponding switch transistor is turned on, and the reference voltage $V_{ref}$ can then be input to the control data line EM; also the seventh control signal ET can be set to a high-level voltage in order to turn off the corresponding switch.

The eighth control signal EIWE can be set to correspond with a low-level voltage in order to turn on the corresponding switch, so that the scanning line GL inputs a scanning voltage $G_n$. Additionally, the ninth control signal EW can be set to a low-level voltage such that the corresponding switch is turned on. Further, the tenth control signal EIT can be set to a high-level voltage such that the corresponding switch is turned off. As a result of this configuration the data line DL can be provided with an input corresponding to the data voltage $V_{data}$.

Therefore, the function of writing the gray-scale data voltage $V_{data}$ of the pixel into the storage capacitor $C_{st}$ and superimposing it with the threshold voltage $V_{th}$ written in the threshold voltage writing stage can be implemented. For a specific implementation process, refer to the foregoing embodiment. To avoid redundancy, it will not be described in detail here.

In the light-emitting stage, the first control signal EIW can be set to a high-level voltage so as to turn off the corresponding switch transistor. In this light-emitting stage the second control signal ETE can be set to a low-level voltage so as to turn on the corresponding switch transistor, so that the first power source line $P_{DD}$ inputs the first power supply voltage $ELV_{DD}$; and the third control signal EITW can be set to a high-level voltage so as to turn off the corresponding switch.

The fourth control signal EE in this stage can be set to a low-level voltage so as to turn on the corresponding switch. Thus, the second power line $P_{SS}$ can be provided with an input corresponding to the second power voltage $ELV_{SS}$. Additionally, in this stage, the fifth control signal EI can be set to a high-level voltage so as to turn off the corresponding switch, and the sixth control signal ETWE can then be set to a low-level voltage so as to turn on the corresponding switch, so that the reference voltage $V_{ref}$ is input to the control data line EM.

In addition, the seventh control signal ET can be set to a high-level voltage in order to turn off the corresponding switch, and the eighth control signal EIWE can be set to a low-level voltage so as to turn on the corresponding switch, in this manner, the scanning line GL inputs a scanning voltage $G_n$.

In the light-emitting phase, the scanning voltage $G_n$ is equal to the second control voltage $V_{GH}$; and the ninth control signal EW is set to a low-level voltage in order to turn on the corresponding switch, and the tenth control signal EIT can then be set to a high-level voltage, so that the corresponding light-emitting transistor is turned off, and the data line DL is input with the data voltage $V_{data}$.

Therefore, the function of maintaining the voltage $V_A$ at point A constant and driving the driving transistor T1 to generate a driving current $I_{DS}$ under the gate voltage can be implemented. For a specific implementation process, refer to the foregoing embodiment. To avoid redundancy, it will not be described in detail here.

It should be noted that, in practical applications, one or more of the first to fifth level switching circuits can be set in a setting area near an operable area for direct operation, or can be integrated in the driver chip to be controlled by the driver chip.

It will then be appreciated, the pixel circuit according to at least one exemplary embodiment of the present disclosure can be composed of a compensation unit, a driving transistor, and a light-emitting diode, wherein the pixel circuit can be configured to sequentially pass through a non-light-emitting phase and a light-emitting phase within a frame time.

In some such embodiments, in the non-light-emitting stage, the first power supply voltage can be input through the second power supply line to turn off the light-emitting diode, and the voltage of the control electrode of the driving transistor can then be adjusted to be equal to the difference between the first voltage and the threshold voltage of the driving transistor through the compensation unit.

In some such embodiments, in the light-emitting stage, a second power supply voltage can be input through the second power supply line to turn on the light-emitting diode, and a first power supply voltage can be input through the first power supply line. By utilizing these power supply voltages, the threshold voltage of the driving transistor in the pixel circuit can be effectively compensated and the driving current of the driving transistor will not be affected by the threshold voltage, thereby ensuring the uniformity of the current of the driving transistor. The pixel circuits as contemplated herein have a simple and potentially compact structure, which is more in-line with the requirement of high resolution of the pixel circuit.

Figure 13:
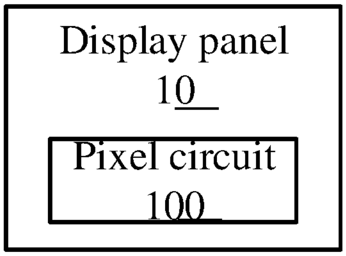
FIG. 13 is a schematic block diagram of a display panel according to some embodiments of the present disclosure.

In addition, some embodiments of the present disclosure also provide a display panel. As shown in FIG. 13, wherein the display panel 10 according to the embodiment of the present disclosure can include the pixel circuit 100 in accordance with any of the above embodiments.

According to the display panel of the embodiment of the present disclosure, through the above-mentioned pixel circuit, the threshold voltage of the driving transistor in the pixel circuit can be effectively compensated, so that the driving current of the driving transistor is not affected by the threshold voltage, thereby ensuring the uniformity of the driving current of the driving transistor. The pixel circuit has a simple structure, which is more in line with the high-resolution requirements of the pixel circuit.

Also contemplated herein, as illustrated in FIG. 11, is a pixel circuit, the pixel circuit can include: a driving sub-circuit having a first end being connected to a first power line; a control end being connected to a first node; and a second end being connected to a second node;

The pixel circuit can also include: a compensation sub-circuit connected to the first node, the second node, a light-emitting control signal line, a scanning signal line, and a data signal line.

As contemplated herein, the light emission control signal line can then be configured to receive one of a first voltage and a reference voltage; the scanning signal line can be configured to receive one of the first control voltage $V_{GL}$ and a second control voltage $V_{GH}$, and the data signal; the data signal line can be configured to receive a data voltage or the reference voltage, and the first power line is configured to receive one of a reset voltage and a first power voltage; the compensation sub-circuit can be configured to be under the control of a reference voltage received from the light emission control signal line, a first voltage received from the scanning signal line, and the reference voltage received from the data signal line; and when the first power line receives the first power voltage, a threshold voltage of the driving sub-circuit can then be compensated.

In some alternative embodiments, the compensation sub-circuit can optionally include: a storage capacitor, the storage capacitor having a first end being connected to the light emission control signal line, and the storage capacitor having a second end of the storage capacitor being connected to the first node; a first switch transistor having a control electrode being connected to the scanning signal line, the first switch transistor having a first electrode being connected to the second node, and the first switch transistor having a second electrode being connected to the second node; and a first capacitor, the first capacitor having a first end being connected to the second node, and the first capacitor having a second end being connected to the data signal line.

In some additional embodiments, the driving sub-circuit can further include a second switching transistor, where the second switching transistor can have a control pole being connected to the first node, the second switching transistor can also have a first pole being connected to the first power line, and the second switching transistor can also have a second pole being connected to the second node.

In some additional embodiments, the pixel circuit can further include a light-emitting diode, wherein the light-emitting diode can include a first end and a second end, the first end of the light-emitting diode can then be connected to the second node, and the second end of the light-emitting diode can be connected to a second power line; In this embodiments the second power line can then be configured to receive one of a first power voltage and a second power voltage.

In some such embodiments, the light-emitting diode can also include a light-emitting element, the light-emitting diode having a first end and a second end, where the first end of the light-emitting element is connected to the second node, and where the second end of the light-emitting element is connected to a second power terminal.

In some such embodiments, the light-emitting diode can also include a device capacitor, the device capacitor having a first terminal and a second terminal, where the first terminal of the device capacitor is connected to a first terminal of the light emitting element, and the second terminal of the device capacitor is connected to a second terminal of the light emitting element.

In some additional embodiments, the pixel circuit can further include a compensation sub-circuit which also includes a storage capacitor having a first end and a second end, where the first end of the storage capacitor is connected to the light emission control signal line, and where the second end of the storage capacitor is connected to the first node; a first switch transistor having a control electrode, a first electrode, and a second electrode, where the control electrode of the first switch transistor is connected to the scanning signal line, where the first electrode of the first switch transistor is connected to the second node, and where the second electrode of the first switch transistor is connected to the second node; and a first capacitor having a first end and a second end, where the first end of the first capacitor is connected to the second node, and where the second end of the capacitor is connected to the data signal line.

Further in this embodiment, the driving sub-circuit can also include a second switching transistor having a control pole, a first pole, and a second pole, where the control pole of the second switching transistor is connected to the first node, where the first pole of the second switching transistor is connected to the first power line, and where the second pole is connected to the second node.

Further in this embodiment, a light-emitting element provided therefore can include a first end and a second end, where the first end of the light-emitting element is connected to the second node, and where the second end of the light-emitting element is connected to a second power terminal; and a device capacitor having a first terminal and a second terminal, where the first terminal of the device capacitor is connected to a first terminal of the light-emitting element, and where the second terminal of the device capacitor is connected to a second terminal of the light-emitting element.

Figure 15:
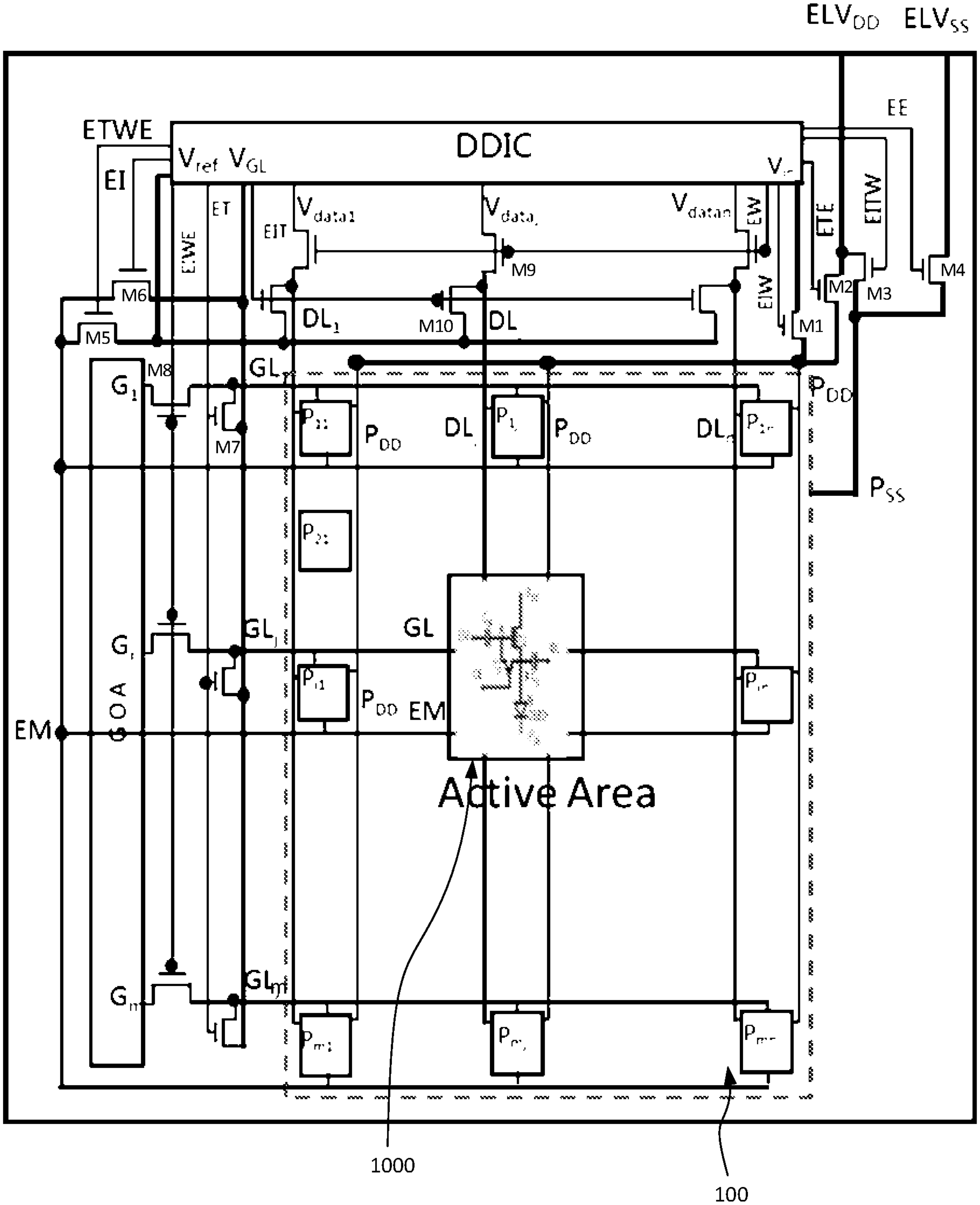
FIG. 15 illustrates a schematic block diagram of another pixel circuit in accordance with various additional aspects of the present invention.

In some embodiments contemplated herein, as illustrated in FIG. 11 and FIG. 15, a display panel can then be provided having an amount of M rows and an amount of N columns of the pixel circuits so as to form a pixel matrix, wherein M and N are positive integers. In some such embodiments, the display panel can then include: a gate driving circuit GOA; a data driving circuit DDIC; a first level switching circuit 2000; a second level switching circuit 3000; a third level switching circuit 4000; an amount of fourth level switching circuits 5000 corresponding to the amount of M rows; and an amount of fifth level switching circuits 6000 corresponding to the amount of N columns.

In this manner, the display panel can be configured such that: the first level switching circuit 2000 is connected to the data driving circuit DDIC and each of the first power lines $P_{DD}$, and is configured to control each of the first power lines to receive a first power voltage $ELV_{DD}$ or a reset voltage $V_{ini}$ from the data driving circuit DDIC; the second level switching circuit 3000 is connected to the data driving circuit DDIC and each of the second power lines $P_{SS}$, and is configured to control each of the second power lines to receive the first power voltage $ELV_{DD}$ or the second power voltage $ELV_{SS}$; the third level switching circuit 4000 is connected to the data driving circuit DDIC and each of the light emission control signal lines EM, and is configured to control each of the light emission control signal lines to receive the first voltage $V_{GL}$ or the reference voltage $V_{ref}$ from the data driving circuit DDIC; each of the M fourth level switching circuits 5000 are provided in a one-to-one correspondence with M rows of scanning signal lines GL, and each of the fourth level switching circuits 5000 is respectively connected to the gate driving circuit GOA and the scanning signal lines GL of each row, and is configured to control each receiving, by the scanning signal line, the second control voltage or the first control voltage from the gate driving circuit; and each of the N fifth level switching circuits 6000 are provided in a one-to-one correspondence with N column data signal lines DL, and each of the fifth level switching circuits 6000 is respectively connected to the data driving circuit DDIC and the data signal line DL of each column, and is configured to control each of the data signal line receives the data voltage \Ta ma or the reference voltage $V_{ref}$ from the data driving circuit.

In some additional embodiments, as illustrated in FIG. 11 and FIG. 15, the first level switch circuit 2000 comprises a first voltage switch transistor M1 and a second voltage switch transistor M2, the first voltage switch transistor M1 comprises a first terminal, a second terminal and a control terminal, the data driving circuit DDIC comprises a reset terminal $V_{ini}$, a first control signal terminal EIW and a second control signal terminal ETE, wherein the first terminal of the first voltage switch transistor is coupled to the first power line $P_{DD}$, the second terminal of the first voltage switch transistor is coupled to the reset terminal $V_{ini}$ of the data driving circuit, the control terminal of the first voltage switch transistor is coupled to the first control signal terminal EIW of the data driving circuit, the second voltage switch transistor comprises a first terminal, a second terminal and a control terminal, wherein the first terminal of the second voltage switch transistor is coupled to the first power line $P_{DD}$, the second terminal of the second voltage switch transistor is configured to receive the first power voltage $ELV_{DD}$, the control terminal of the second voltage switch transistor is coupled to the second control signal terminal ETE of the data driving circuit.

In some additional embodiments, the second level switch circuit 3000 comprises a third voltage switch transistor M3 and a fourth voltage switch transistor M4, the third voltage switch transistor comprises a first terminal, a second terminal and a control terminal, the fourth voltage switch transistor comprises a first terminal, a second terminal and a control terminal, the data driving circuit DDIC comprises a fourth control signal terminal EE, wherein the first terminal of the third voltage switch transistor and the first terminal of the fourth voltage switch transistor are coupled to the second power line $P_{SS}$, the second terminal of the third voltage switch transistor is configured to receive the first power voltage $ELV_{DD}$, the control terminal of the third voltage switch transistor is coupled to the third control signal terminal EITW, the second terminal of the fourth voltage switch transistor is configured to receive the second power voltage $ELV_{SS}$, the control terminal of the fourth voltage switch transistor is coupled to the fourth control signal terminal EE of the data driving circuit.

In some additional embodiments, the third level switch circuit 4000 comprises a fifth voltage switch transistor M5 and a sixth voltage switch transistor M6, the fifth voltage switch transistor comprises a first terminal, a second terminal and a control terminal, the sixth voltage switch transistor comprises a first terminal, a second terminal and a control terminal, the data driving circuit comprises a reference voltage signal terminal $V_{ref}$, a sixth control signal terminal ETWE, a first voltage terminal $V_{GL}$ and a fifth control signal EI, wherein the first terminal of the fifth voltage switch transistor and the first terminal of the sixth voltage switch transistor are coupled to the light emission control signal line EM, the second terminal of the fifth voltage switch transistor is coupled to the sixth control signal terminal $V_{ref}$, the control terminal of the fifth voltage switch transistor is coupled to the sixth control signal terminal ETWE, the second terminal of the sixth voltage switch transistor is coupled to the first voltage terminal $V_{GL}$ of the data driving circuit, the control terminal of the sixth voltage switch transistor is coupled to the fifth control signal EI of the data driving circuit.

In some additional embodiments, each of the fourth level switch 5000 circuits comprises a seventh voltage switch transistor M7 and a eighth voltage switch transistor M8, the seventh voltage switch transistor comprises a first terminal, a second terminal and a control terminal, the eighth voltage switch transistor comprises a first terminal, a second terminal and a control terminal, the gate driving circuit comprises a eighth control signal terminal Gi, wherein the first terminal of the seventh voltage switch transistor and the first terminal of the eighth voltage switch transistor are coupled to the scanning signal line GL, the second terminal of the seventh voltage switch transistor is coupled to the first voltage terminal $V_{GL}$ of the data driving circuit, the control terminal of the seventh voltage switch transistor is coupled to the seventh control signal terminal ET, the second terminal of the eighth voltage switch transistor is coupled to the gate driving circuit GOA, the control terminal of the eighth voltage switch transistor is coupled to the eighth control signal terminal EIWE.

In some additional embodiments, each of the fifth level switch 6000 circuits comprises a ninth voltage switch transistor M9 and a tenth voltage switch transistor M10, the ninth voltage switch transistor comprises a first terminal, a second terminal and a control terminal, the tenth voltage switch transistor comprises a first terminal, a second terminal and a control terminal, the gate driving circuit comprises a eighth control signal terminal, wherein the first terminal of the ninth voltage switch transistor and the first terminal of the tenth voltage switch transistor are coupled to the corresponding data signal line DL, the second terminal of the ninth voltage switch transistor is coupled to a data signal terminal $V_{dataj}$ of the data driving circuit, the control terminal of the ninth voltage switch transistor is coupled to a ninth control signal terminal EW of the data driving circuit, the second terminal of the tenth voltage switch transistor is coupled to the reference voltage signal terminal $V_{ref}$ of the data driving circuit, the control terminal of the tenth voltage switch transistor is coupled to the tenth control signal terminal EIT of the data driving circuit.

In some embodiments, as shown in FIG. 15, a display panel can include a plurality of pixel circuits provided in M rows and N columns thus defining an active area, a gate driving circuit (Gate driving circuit, GOA), and a data driving chip (Data Driving Circuit (DDIC). The gate drive circuit can include a number of cascaded shift register units corresponding in number to M, wherein each shift register unit can be connected to a scan line GL for outputting a scan voltage G, such as the output of an it h shift register unit and a scanning signal Gi. Each pixel circuit can then be used to drive a light-emitting element. The pixel circuit in the i-th row and a j-th column represented by the pixel circuit Pij in the middle of the figure is 1≤i≤M, 1≤j≤N. In this embodiment, all pixel circuits are connected to the same a third level switching circuit 4000 through the scanning signal line EM, and a third level switching circuit 4000 includes all the pixel circuits connected to the first level switching circuit 2000 through the first power line $P_{DD}$. All pixel circuits, including the second power line $P_{SS}$, are connected to the same a second level switching circuit 3000.

Each of the pixel circuits which are located in a common row are all connected to a fourth level switching circuit, illustrated as 5000 of FIG. 11, through the scanning line GL, wherein each row can be be provided with a fourth level switching circuit 5000, such as a fourth level switching of the pixel circuit in the i-th row. The circuit 5000 can then be connected to the output terminal of the i-th shift register unit of the GOA and can thus be used to receive the i-th scan signal Gi.

Specifically, the pixel circuit in the i-th row can be connected to a fourth level switching circuit 5000 through the scan line GLi, wherein the first pole of a seventh transistor M7, and a fourth level switching circuit 5000 includes the first pole of the eighth transistor M8 are configured for receiving the scan signal Gi output by the i-th shift register unit.

Each of the pixel circuits which are located in the same column are connected to a fifth level switching circuit 6000 through a data line DL, and a pixel level circuit in each column which can then be provided with a fifth level switching circuit 6000. For example, the pixel circuit in the $j^{th}$ column is connected to a fifth through a data line $DL_j$, wherein the level switching circuit 6000 can include a first pole of the tenth transistor M10, and a first pole of the ninth transistor M9 can be connected to the DDIC for receiving the data voltage $V_{dataj}$ of the pixel circuit in the $j^{th}$ column.

DDIC can then also used to output EI, EIWE, ET, ETWE, EIT, EW, EIW, ETE, EITW, EE, $V_{ref}$, $V_{GL}$, $V_{ini}$.

Also contemplated herein, is a display apparatus which can include a housing, wherein the housing can contain a display panel according to any of the embodiments as discussed herein.

Also contemplated herein is a method for driving a pixel circuit according to any of the structural embodiments discussed above, wherein the method can include steps of: in the reset stage, utilizing the scanning signal line to receive a second voltage, utilizing the light-emitting control signal line to receive a first voltage, utilizing the data signal line to receive a reference voltage, and utilizing the first power line to receive a reset voltage to reset the pixel circuit; in the compensation phase, utilizing the first power line to receive the first power voltage, utilizing the light-emitting control signal line to receive the reference voltage, utilizing the scanning signal line to receive the first voltage, and utilizing the data signal line to receive the reference voltage to write the threshold voltage of the driving sub-circuit into the compensation sub-circuit; and in the data writing phase, utilizing the first power line to receiver the reset voltage, utilizing the light emission control signal line to receive the reference voltage, utilizing the scanning signal line to receive a scan voltage, and the scan voltage is equal to Said first voltage, said then utilizing the data signal line to receive a data voltage of a current row.

In some embodiments, the method can further include additional steps, in the light-emitting phase, utilizing the second power supply terminal to receive a second power supply voltage, so that the light-emitting element is turned on, utilizing the first power supply line to receive the first power supply voltage, and where the first power supply voltage is greater than the second power supply voltage.

In some embodiments the method can further include optional structure and additional associated steps, wherein the compensation sub-circuit can include a first switching transistor, a first capacitor, and a storage capacitor, and the driving sub-circuit includes a second switching transistor; wherein in the reset phase, utilizing the light-emitting control signal line to receive a first voltage to turn on the second switch, and utilizing the scanning signal line to receive a second voltage to turn off the first switch; in the compensation phase, utilizing the light-emitting control signal line receives a reference voltage to turn on the second switch, and utilizing the scanning signal line to receive the first voltage to turn on the first switch; the first power source, where the voltage charges the first capacitor and the storage capacitor through the second switching transistor, so that the voltages of the first node and the second node are both equal to the difference so as to compensate the compensation sub-circuit.

In some embodiments the method can further include steps, wherein in the data writing phase, utilizing the first power line to receive the reset voltage, and utilizing the light-emitting control signal line to receive the reference voltage, so that the second switch is turned off, and the scanning voltage is equal to the first voltage when the current line is scanned, so that the first switch is turned on to write the data voltage of the pixel into the storage capacitor.

In some embodiments the method can further include steps, wherein the reset voltage satisfies the following relationship:

$$V_{GL} + ELV_{DD} - V_{th} + \frac{C_a \times V_{data} - (C_b + 2C_a) \times V_{ref}}{C_b + C_a} < V_{ini} - V_{th};$$

wherein:

$V_{GL}$ is the first voltage;

$ELV_{DD}$ is the first power supply voltage;

$V_{th}$ is a threshold voltage of the second switch;

$C_a$ is a capacitance value of the first capacitor;

$V_{data}$ is a data voltage of the current row;

$C_b$ is a capacitance value of the storage capacitor;

$V_{ref}$ is the reference voltage; and $V_{ini}$ is the reset voltage.

Figure 14:
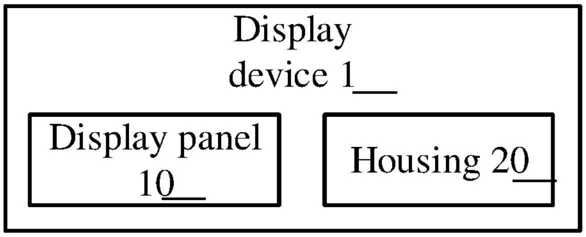
FIG. 14 is a block diagram of a display apparatus according to some embodiments of the present disclosure.

In addition, some embodiments of the present disclosure also provide a display apparatus. As shown in FIG. 14, the display apparatus 1 according to the embodiment of the present disclosure can include a housing 20, and the display panel 10 in the above embodiments.

Various embodiments of the disclosure can have one or more of the following advantages. For example, in the display apparatus, the threshold voltage of the driving transistor in the pixel circuit can be effectively compensated so that the driving current of the driving transistor is not affected by the threshold voltage, thereby ensuring the uniformity of the current of the driving transistor. In addition, the pixel circuit has a simple structure, which is more in line with the requirement of high resolution of the pixel circuit.

It should be understood that each part of the present disclosure can be implemented by hardware, software, firmware, or a combination thereof. In the above embodiments, multiple steps or methods can be implemented by software or firmware stored in a memory and executed by a suitable instruction execution system. For example, if implemented in hardware, as in another embodiment, it can be implemented using any one or a combination of the following techniques known in the art: Discrete logic circuits, ASICs with suitable combinational logic gate circuits, programmable gate arrays (PGA), field programmable gate arrays (FPGA), etc.

It is apparent that those of ordinary skill in the art can make various modifications and variations to the embodiments of the disclosure without departing from the spirit and scope of the disclosure. Thus, it is intended that the present disclosure cover the modifications and the modifications.

Various embodiments in this specification have been described in a progressive manner, where descriptions of some embodiments focus on the differences from other embodiments, and same or similar parts among the different embodiments are sometimes described together in only one embodiment.

In addition, in the description of the present disclosure, the terms "center," "longitudinal," "lateral," "length," "width," "thickness," "upper," "lower," "front," "rear," "left," "right," "vertical," "horizontal," "top," "bottom," "inside," "outside," "clockwise," "counterclockwise," "axial," "radial," "circumferential," etc. are based on the azimuth or position relationship shown in the drawings, and are only for the convenience of describing the present disclosure and simplifying the description. The orientation and construction and operation in a specific orientation cannot be understood as a limitation on the present disclosure.

In addition, the terms "first" and "second" are used for descriptive purposes only and cannot be understood as indicating or implying relative importance or implicitly indicating the number of technical features indicated. Therefore, the features defined as "first" and "second" can explicitly or implicitly include at least one of the features. In the description of the present disclosure, the meaning of "a plurality" is at least two, for example, two, three, etc., unless it is specifically and specifically defined otherwise.

Moreover, the terms "include," "including," or any other variations thereof are intended to cover a non-exclusive inclusion within a process, method, article, or apparatus that comprises a list of elements including not only those elements but also those that are not explicitly listed, or other elements that are inherent to such processes, methods, goods, or equipment.

In the case of no more limitation, the element defined by the sentence "includes a . . . " does not exclude the existence of another identical element in the process, the method, or the device including the element.

Specific examples are used herein to describe the principles and implementations of some embodiments. The description is only used to help convey understanding of the possible methods and concepts. Meanwhile, those of ordinary skill in the art can change the specific manners of implementation and application thereof without departing from the spirit of the disclosure. The contents of this specification therefore should not be construed as limiting the disclosure.

In the descriptions, with respect to circuit(s), unit(s), device(s), component(s), etc., in some occurrences singular forms are used, and in some other occurrences plural forms are used in the descriptions of various embodiments. It should be noted; however, the single or plural forms are not limiting but rather are for illustrative purposes. Unless it is expressly stated that a single unit, device, or component etc. is employed, or it is expressly stated that a plurality of units, devices or components, etc. are employed, the circuit(s), unit(s), device(s), component(s), etc. can be singular, or plural.

Based on various embodiments of the present disclosure, the disclosed apparatuses, devices, and methods can be implemented in other manners. For example, the abovementioned devices can employ various methods of use or implementation as disclosed herein.

Dividing the device into different "regions," "units," or "layers," etc. merely reflect various logical functions according to some embodiments, and actual implementations can have other divisions of "regions," "units," or "layers," etc. realizing similar functions as described above, or without divisions. For example, multiple regions, units, or layers, etc. can be combined or can be integrated into another system. In addition, some features can be omitted, and some steps in the methods can be skipped.

Those of ordinary skill in the art will appreciate that the units, regions, or layers, etc. in the devices provided by various embodiments described above can be provided in the one or more devices described above. They can also be located in one or multiple devices that is (are) different from the example embodiments described above or illustrated in the accompanying drawings. For example, the units, regions, or layers, etc. in various embodiments described above can be integrated into one module or divided into several submodules.

The order of the various embodiments described above are only for the purpose of illustration, and do not represent preference of embodiments.

Although specific embodiments have been described above in detail, the description is merely for purposes of illustration. It should be appreciated, therefore, that many aspects described above are not intended as required or essential elements unless explicitly stated otherwise.

In the present disclosure, the terms "installation," "connected," "connected," "fixed" and other terms shall be understood in a broad sense unless otherwise specified and limited, for example, they can be fixed connections or removable connections or integrated; it can be mechanical or electrical; it can be directly connected or indirectly connected through an intermediate medium; it can be the internal connection of two elements or the interaction between two elements, unless otherwise specified. For those of ordinary skill in the art, the specific meanings of the above terms in the present disclosure can be understood according to specific situations.

In the present disclosure, unless explicitly stated and defined otherwise, the first feature being "on" or "over" the second feature may be the first and second features in direct contact, or the first and second features indirectly contact through an intermediate medium. Moreover, the first feature being "above" the second feature may indicate that the first feature is directly above or obliquely above the second feature, or it only indicates that the first feature is higher in level than the second feature. The first feature being "below," "under," or "underneath" the second feature indicates that the first feature may be directly below or obliquely below the second feature, or it may simply indicate that the first feature is less horizontal than the second feature.

In the description of this specification, the description with reference to the terms "one embodiment," "some embodiments," "examples," "specific examples," or "some examples" and the like means specific features described in conjunction with the embodiments or examples. Structures, materials, or features are included in at least one embodiment or example of the disclosure. In this specification, the schematic expressions of the above terms are not necessarily directed to the same embodiment or example. Furthermore, the particular features, structures, materials, or characteristics described can be combined in any suitable manner in any one or more embodiments or examples. In addition, without any contradiction, those skilled in the art can combine and combine different embodiments or examples and features of the different embodiments or examples described in this specification.

Various modifications of, and equivalent acts corresponding to the disclosed aspects of the exemplary embodiments can be made in addition to those described above by a person of ordinary skill in the art having the benefit of the present disclosure without departing from the spirit and scope of the disclosure contemplated by this disclosure and as defined in the following claims. As such, the scope of this disclosure is to be accorded the broadest reasonable interpretation so as to encompass such modifications and equivalent structures.

What is claimed is:

1. A pixel circuit comprising:

a driving sub-circuit, the driving sub-circuit comprising:
  a first end being connected to a first power line;
  a control end being connected to a first node; and
  a second end being connected to a second node;

a compensation sub-circuit connected to the first node, the second node, a light emission control signal line, a scanning signal line, and a data signal line;

wherein:

the light emission control signal line is configured to receive one of a first voltage and a reference voltage;

the scanning signal line is configured to receive one of a first control voltage and a second control voltage;

the data signal line is configured to receive one of a data voltage and the reference voltage, and the first power line is configured to receive one of a reset voltage and a first power voltage;

the compensation sub-circuit is configured to be under control of the reference voltage received from the light emission control signal line, the first control voltage received from the scanning signal line, and the reference voltage received from the data signal line;

when the first power line receives the first power voltage, a threshold voltage of the driving sub-circuit is compensated;

the pixel circuit further comprises:

a light-emitting diode having a first end and a second end, the first end of the light-emitting diode being connected to the second node, and the second end of the light-emitting diode being connected to a second power line;

wherein the second power line is configured to receive one of the first power voltage and a second power voltage; and wherein the light-emitting diode comprises a device capacitor having a first terminal and a second terminal respectively connected to the first end and the second end;

wherein the compensation sub-circuit further comprises:

a storage capacitor, the storage capacitor having a first end being connected to the light emission control signal line, and the storage capacitor having a second end being connected to the first node;

a first switch transistor having a control electrode being connected to the scanning signal line, the first switch transistor having a first electrode being connected to the second node, and the first switch transistor having a second electrode being connected to the second node; and a first capacitor, the first capacitor having a first end being connected to the second node, and the first capacitor having a second end being connected to the data signal line.

2. The pixel circuit according to claim 1, wherein the driving sub-circuit further comprises:

a second switching transistor, the second switching transistor having a control pole being connected to the first node, the second switching transistor having a first pole being connected to the first power line, and the second switching transistor having a second pole being connected to the second node.

3. The pixel circuit according to claim 1, wherein the light-emitting diode further comprises:

a light-emitting element, the light-emitting element having a first end and a second end, where the first end of the light-emitting element is connected to the second node, and where the second end of the light-emitting element is connected to a second power line.

4. The pixel circuit according to claim 3, wherein:

the compensation sub-circuit further comprises:

a storage capacitor having a first end and a second end, where the first end of the storage capacitor is connected to the light emission control signal line, and where the second end of the storage capacitor is connected to the first node;

a first switch transistor having a control electrode, a first electrode, and a second electrode, where the control electrode of the first switch transistor is connected to the scanning signal line, where the first electrode of the first switch transistor is connected to the second node, and where the second electrode of the first switch transistor is connected to the second node; and a first capacitor having a first end and a second end, where the first end of the first capacitor is connected to the second node, and where the second end of the capacitor is connected to the data signal line;

the driving sub-circuit further comprises:

a second switching transistor having a control pole, a first pole, and a second pole, where the control pole of the second switching transistor is connected to the first node, where the first pole of the second switching transistor is connected to the first power line, and where the second pole is connected to the second node.

5. A display panel comprising an amount of M rows and an amount of N columns of the pixel circuits according to claim 1, wherein M and N are positive integers; wherein the display panel further comprises:

a gate driving circuit;

a data driving circuit;

a first level switching circuit;

a second level switching circuit;

a third level switching circuit;

an amount of fourth level switching circuits corresponding to the amount of M rows; and an amount of fifth level switching circuits corresponding to the amount of N columns;

wherein:

the first level switching circuit is connected to the data driving circuit and each first power terminal, and is configured to control each first power line to receive the first power voltage or the reset voltage from the data driving circuit;

the second level switching circuit is connected to the data driving circuit and each second power line, and is configured to control each of the second power lines to receive the first power voltage or the second power voltage;

the third level switching circuit is connected to the data driving circuit and each light emission control signal line, and is configured to control each light emission control signal line to receive the first voltage or the reference voltage from the data driving circuit;

each of the M fourth level switching circuits are provided in a one-to-one correspondence with M rows of scanning signal lines, and each of the fourth level switching circuits is respectively connected to the gate driving circuit and the corresponding scanning signal line, and is configured to control the corresponding scanning signal line to receive the second control voltage or the first control voltage from the gate driving circuit; and each of the N fifth level switching circuits are provided in a one-to-one correspondence with N column data signal lines, and each of the fifth level switching circuits is respectively connected to the data driving circuit and the corresponding data signal line, and is configured to control the corresponding data signal line to receive the data voltage or the reference voltage from the data driving circuit.

6. The display panel according to claim 5, wherein:

the first level switching circuit comprises a first voltage switch transistor and a second voltage switch transistor, the first voltage switch transistor comprises a first terminal, a second terminal and a control terminal, the data driving circuit comprises a reset terminal, a first control signal terminal and a second control signal terminal, wherein the first terminal of the first voltage switch transistor is coupled to the first power line, the second terminal of the first voltage switch transistor is coupled to the reset terminal of the data driving circuit, the control terminal of the first voltage switch transistor is coupled to the first control signal terminal of the data driving circuit, the second voltage switch transistor comprises a first terminal, a second terminal and a control terminal, wherein the first terminal of the second voltage switch transistor is coupled to the first power line, the second terminal of the second voltage switch transistor is configured to receive the first power voltage, the control terminal of the second voltage switch transistor is coupled to the second control signal terminal of the data driving circuit.

7. The display panel according to claim 5, wherein:

the second level switching circuit comprises a third voltage switch transistor and a fourth voltage switch transistor, the third voltage switch transistor comprises a first terminal, a second terminal and a control terminal, the fourth voltage switch transistor comprises a first terminal, a second terminal and a control terminal, the data driving circuit comprises a fourth control signal terminal, wherein the first terminal of the third voltage switch transistor and the first terminal of the fourth voltage switch transistor are coupled to the second power line, the second terminal of the third voltage switch transistor is configured to receive the first power voltage, the control terminal of the third voltage switch transistor is coupled to a third control signal terminal, the second terminal of the fourth voltage switch transistor is configured to receive the second power voltage, the control terminal of the fourth voltage switch transistor is coupled to the fourth control signal terminal of the data driving circuit.

8. The display panel according to claim 5, wherein:

the third level switching circuit comprises a fifth voltage switch transistor and a sixth voltage switch transistor, the fifth voltage switch transistor comprises a first terminal, a second terminal and a control terminal, the sixth voltage switch transistor comprises a first terminal, a second terminal and a control terminal, the data driving circuit comprises a reference voltage signal terminal, a sixth control signal terminal, a first voltage terminal and a fifth control signal, wherein the first terminal of the fifth voltage switch transistor and the first terminal of the sixth voltage switch transistor are coupled to the light emission control signal line, the second terminal of the fifth voltage switch transistor is coupled to the sixth control signal terminal, the control terminal of the fifth voltage switch transistor is coupled to the sixth control signal terminal, the second terminal of the sixth voltage switch transistor is coupled to the first voltage terminal of the data driving circuit, the control terminal of the sixth voltage switch transistor is coupled to the fifth control signal of the data driving circuit.

9. The display panel according to claim 5, wherein:

each of the fourth level switching circuits comprises a seventh voltage switch transistor and a eighth voltage switch transistor, the seventh voltage switch transistor comprises a first terminal, a second terminal and a control terminal, the eighth voltage switch transistor comprises a first terminal, a second terminal and a control terminal, the data driving circuit comprises a seventh control signal terminal and a eighth control signal terminal, wherein the first terminal of the seventh voltage switch transistor and the first terminal of the eighth voltage switch transistor are coupled to the scanning signal line, the second terminal of the seventh voltage switch transistor is coupled to the first voltage terminal of the data driving circuit, the control terminal of the seventh voltage switch transistor is coupled to the seventh control signal terminal, the second terminal of the eighth voltage switch transistor is coupled to the gate driving circuit, the control terminal of the eighth voltage switch transistor is coupled to the eighth control signal terminal.

10. The display panel according to claim 5, wherein:

each of the fifth level switching circuits comprises a ninth voltage switch transistor and a tenth voltage switch transistor, the ninth voltage switch transistor comprises a first terminal, a second terminal and a control terminal, the tenth voltage switch transistor comprises a first terminal, a second terminal and a control terminal, the data driving circuit comprises a ninth control signal terminal and a tenth control signal terminal, wherein the first terminal of the ninth voltage switch transistor and the first terminal of the tenth voltage switch transistor are coupled to the corresponding data signal line, the second terminal of the ninth voltage switch transistor is coupled to a data signal terminal of the data driving circuit, the control terminal of the ninth voltage switch transistor is coupled to the ninth control signal terminal of the data driving circuit, the second terminal of the tenth voltage switch transistor is coupled to the reference voltage signal terminal of the data driving circuit, the control terminal of the tenth voltage switch transistor is coupled to the tenth control signal terminal of the data driving circuit.

11. A display apparatus comprising: a housing, and a display panel comprising an amount of M rows and an amount of N columns of pixel circuits each comprising:

a driving sub-circuit, the driving sub-circuit comprising:

a first end being connected to a first power line;

a control end being connected to a first node; and a second end being connected to a second node;

a compensation sub-circuit connected to the first node, the second node, a light emission control signal line, a scanning signal line, and a data signal line;

wherein:

the light emission control signal line is configured to receive one of a first voltage and a reference voltage;

the scanning signal line is configured to receive one of a first control voltage and a second control voltage;

the data signal line is configured to receive one of a data voltage and the reference voltage, and the first power line is configured to receive one of a reset voltage and a first power voltage;

the compensation sub-circuit is configured to be under control of the reference voltage received from the light emission control signal line, the first control voltage received from the scanning signal line, and the reference voltage received from the data signal line;

when the first power line receives the first power voltage, a threshold voltage of the driving sub-circuit is compensated;

the pixel circuit further comprises:

a light-emitting diode having a first end and a second end, the first end of the light-emitting diode being connected to the second node, and the second end of the light-emitting diode being connected to a second power line;

wherein the second power line is configured to receive one of the first power voltage and a second power voltage; and wherein the light-emitting diode comprises a device capacitor having a first terminal and a second terminal respectively connected to the first end and the second end;

wherein M and N are positive integers; wherein the display panel further comprises:

a gate driving circuit;

a data driving circuit;

a first level switching circuit;

a second level switching circuit;

a third level switching circuit;

an amount of fourth level switching circuits corresponding to the amount of M rows; and an amount of fifth level switching circuits corresponding to the amount of N columns;

wherein:

the first level switching circuit is connected to the data driving circuit and each first power terminal, and is configured to control each first power line to receive the first power voltage or the reset voltage from the data driving circuit;

the second level switching circuit is connected to the data driving circuit and each second power line, and is configured to control the each second power line to receive the first power voltage or the second power voltage;

the third level switching circuit is connected to the data driving circuit and each light emission control signal line, and is configured to control the each light emission control signal line to receive the first voltage or the reference voltage from the data driving circuit;

each of the M fourth level switching circuits are provided in a one-to-one correspondence with M rows of scanning signal lines, and each of the fourth level switching circuits is respectively connected to the gate driving circuit and the corresponding scanning signal line, and is configured to control the corresponding scanning signal line to receive the second control voltage or the first control voltage from the gate driving circuit; and each of the N fifth level switching circuits are provided in a one-to-one correspondence with N column data signal lines, and each of the fifth level switching circuits is respectively connected to the data driving circuit and the corresponding data signal line, and is configured to control the corresponding data signal line to receive the data voltage or the reference voltage from the data driving circuit;

wherein the compensation sub-circuit further comprises:

a storage capacitor, the storage capacitor having a first end being connected to the light emission control signal line, and the storage capacitor having a second end being connected to the first node;

a first switch transistor having a control electrode being connected to the scanning signal line, the first switch transistor having a first electrode being connected to the second node, and the first switch transistor having a second electrode being connected to the second node; and a first capacitor, the first capacitor having a first end being connected to the second node, and the first capacitor having a second end being connected to the data signal line.

12. The display apparatus according to claim 11, wherein the driving sub-circuit further comprises:

a second switching transistor, the second switching transistor having a control pole being connected to the first node, the second switching transistor having a first pole being connected to the first power line, and the second switching transistor having a second pole being connected to the second node.

13. The display apparatus according to claim 11, wherein the light-emitting diode further comprises:

a light-emitting element, the light-emitting element having a first end and a second end, where the first end of the light-emitting element is connected to the second node, and where the second end of the light-emitting element is connected to a second power line.

14. The display apparatus according to claim 13, wherein:

the compensation sub-circuit further comprises:

a storage capacitor having a first end and a second end, where the first end of the storage capacitor is connected to the light emission control signal line, and where the second end of the storage capacitor is connected to the first node;

a first switch transistor having a control electrode, a first electrode, and a second electrode, where the control electrode of the first switch transistor is connected to the scanning signal line, where the first electrode of the first switch transistor is connected to the second node, and where the second electrode of the first switch transistor is connected to the second node; and a first capacitor having a first end and a second end, where the first end of the first capacitor is connected to the second node, and where the second end of the capacitor is connected to the data signal line;

the driving sub-circuit further comprises:

a second switching transistor having a control pole, a first pole, and a second pole, where the control pole of the second switching transistor is connected to the first node, where the first pole of the second switching transistor is connected to the first power line, and where the second pole is connected to the second node.

15. A method for driving a pixel circuit, the pixel circuit comprising:

a driving sub-circuit, the driving sub-circuit comprising:

a first end being connected to a first power line;

a control end being connected to a first node; and a second end being connected to a second node;

a compensation sub-circuit connected to the first node, the second node, a light emission control signal line, a scanning signal line, and a data signal line;

wherein:

the light emission control signal line is configured to receive one of a first voltage and a reference voltage;

the scanning signal line is configured to receive one of a first control voltage and a second control voltage;

the data signal line is configured to receive one of a data voltage and the reference voltage, and the first power line is configured to receive one of a reset voltage and a first power voltage;

the compensation sub-circuit is configured to be under control of the reference voltage received from the light emission control signal line, the first control voltage received from the scanning signal line, and the reference voltage received from the data signal line;

when the first power line receives the first power voltage, a threshold voltage of the driving sub-circuit is compensated;

the pixel circuit further comprises:

a light-emitting diode having a first end and a second end, the first end of the light-emitting diode being connected to the second node, and the second end of the light-emitting diode being connected to a second power line;

wherein the second power line is configured to receive one of the first power voltage and a second power voltage; and wherein the light-emitting diode comprises a device capacitor having a first terminal and a second terminal respectively connected to the first end and the second end;

the method comprising:

in a reset stage, utilizing the scanning signal line to receive the second control voltage, utilizing the light emission control signal line to receive the first voltage, utilizing the data signal line to receive the reference voltage, and utilizing the first power line to receive the reset voltage to reset the pixel circuit;

in a compensation phase, utilizing the first power line to receive the first power voltage, utilizing the light emission control signal line to receive the reference voltage, utilizing the scanning signal line to receive the first control voltage, and utilizing the data signal line to receive the reference voltage to write a threshold voltage of the driving sub-circuit into the compensation sub-circuit; and in a data writing phase, utilizing the first power line to receive the reset voltage, utilizing the light emission control signal line to receive the reference voltage, utilizing the scanning signal line to receive the first control voltage, and the first control voltage is equal to the first voltage, and then utilizing the data signal line to receive a data voltage of a current row;

wherein the compensation sub-circuit further comprises:

a storage capacitor, the storage capacitor having a first end being connected to the light emission control signal line, and the storage capacitor having a second end being connected to the first node;

a first switch transistor having a control electrode being connected to the scanning signal line, the first switch transistor having a first electrode being connected to the second node, and the first switch transistor having a second electrode being connected to the second node; and a first capacitor, the first capacitor having a first end being connected to the second node, and the first capacitor having a second end being connected to the data signal line.

16. The driving method according to claim 15, further comprising:

in a light-emitting phase, utilizing the second power line to receive a second power supply voltage, so that the light-emitting element is turned on, utilizing the first power line to receive the first power voltage, and where the first power voltage is greater than the second power voltage.

17. The driving method according to claim 16, wherein the compensation sub-circuit includes a first switching transistor, a first capacitor, and a storage capacitor, and the driving sub-circuit includes a second switching transistor; wherein:

in the reset phase, utilizing the light emission control signal line to receive the first voltage to turn on the second switching transistor, and utilizing the scanning signal line to receive the second control voltage to turn off the first switching transistor;

in the compensation phase, utilizing the light-emitting control signal line receives the reference voltage to turn on the second switching transistor, and utilizing the scanning signal line to receive the first control voltage to turn on the first switching transistor; the first power voltage charges the first capacitor and the storage capacitor through the second switching transistor, so that the voltages of the first node and the second node are both equal to the difference of the first power voltage and a threshold voltage of the second switching transistor so as to compensate the compensation sub-circuit;

in the data writing phase, utilizing the first power line to receive the reset voltage, and utilizing the light emission control signal line to receive the reference voltage, so that the second switching transistor is turned off, and the first control voltage is equal to the first voltage when the current line is scanned, so that the first switching transistor is turned on to write the data voltage of the pixel into the storage capacitor.

18. The driving method according to claim 17, wherein the reset voltage satisfies:

$$V_{GL} + ELV_{DD} - V_{th} + \frac{C_a \times V_{data} - (C_b + 2C_a) \times V_{ref}}{C_b + C_a} < V_{ini} - V_{th};$$

wherein:

$V_{GL}$ is the first voltage;

$ELV_{DD}$ is the first power voltage;

$V_{th}$ is a threshold voltage of the second switching transistor;

$C_a$ is a capacitance value of the first capacitor;

$V_{data}$ is a data voltage of the current row;

$C_b$ is a capacitance value of the storage capacitor;

$V_{ref}$ is the reference voltage; and $V_{ini}$ is the reset voltage.

* * * * *